United States Patent
Kobata et al.

(10) Patent No.: US 7,051,003 B1
(45) Date of Patent: May 23, 2006

(54) METHOD AND APPARATUS FOR DELIVERING ELECTRONIC DATA THROUGH A PROXY SERVER

(75) Inventors: Hiroshi Kobata, Brookline, MA (US); Robert Gagne, Boston, MA (US)

(73) Assignee: Atabok Japan, Inc., Tokyo (JP)

( * ) Notice: Subject to any disclaimer, the term of this patent is extended or adjusted under 35 U.S.C. 154(b) by 794 days.

(21) Appl. No.: 09/334,309

(22) Filed: Jun. 16, 1999

Related U.S. Application Data

(63) Continuation-in-part of application No. 09/258,609, filed on Feb. 26, 1998.

(51) Int. Cl.
*G06F 17/60* (2006.01)
*H04L 12/58* (2006.01)

(52) U.S. Cl. .............. 705/51; 705/54; 380/3; 380/4; 380/23

(58) Field of Classification Search .......... 380/21, 380/23–25, 3, 4
See application file for complete search history.

(56) References Cited

U.S. PATENT DOCUMENTS

| | | | |
|---|---|---|---|
| 4,532,588 A | 7/1985 | Foster | |
| 4,837,798 A | 6/1989 | Cohen et al. | |
| 5,008,814 A | 4/1991 | Mathur | |
| 5,191,573 A | 3/1993 | Hair | |
| 5,381,480 A * | 1/1995 | Butter et al. | 380/37 |

(Continued)

FOREIGN PATENT DOCUMENTS

| | | |
|---|---|---|
| EP | WO 9712460 | 4/1997 |
| EP | 0798899 A1 | 10/1997 |
| EP | 0812100 A2 | 12/1997 |
| EP | 0887755 A2 | 12/1998 |
| GB | 2339367 A | 1/2000 |

OTHER PUBLICATIONS

"Backweb Technologies"; M2 Presswire; pp. 1–4; Dec. 9, 1998.

*Primary Examiner*—James P. Trammell
*Assistant Examiner*—Daniel L Greene
(74) *Attorney, Agent, or Firm*—Fish & Richardson P.C.

(57) ABSTRACT

An electronic parcel delivery system for delivering digital information between computer systems over a network is described. The parcel delivery system includes a server system interposed between a sending system and a receiving system. The server system stores digital information received over the network. The digital information can represent a parcel, document, image, executable software, audio file, etc. The sending system transmits a notification to the receiving system. The notification signifies that the sending system is transmitting the digital information to the server system over the network and that the digital information may be accessible by the receiving system. The receiving system can receive the notification directly from the sending system or through a second server system connected to the network. The server system can receive the digital information directly from the sending system or through a second server system connected to the network. The server system can include a web page that the receiving system can access to obtain the stored digital information. The notification can include a resource locator that addresses the Web page on the server system. The Web page can request valid authentication of the receiving system before granting access to the digital information. Delivery of the digital information can be canceled by the sending system after the sending system transmits the digital information to the server system until the receiving system uses the digital information.

12 Claims, 20 Drawing Sheets

U.S. PATENT DOCUMENTS

| | | | |
|---|---|---|---|
| 5,424,724 A | 6/1995 | Williams et al. | |
| 5,495,610 A | 2/1996 | Shing et al. | |
| 5,509,074 A * | 4/1996 | Choudhury et al. | 380/23 |
| 5,557,678 A * | 9/1996 | Ganesan | 380/21 |
| 5,557,798 A | 9/1996 | Skeen et al. | |
| 5,581,764 A | 12/1996 | Fitzgerald et al. | |
| 5,646,992 A | 7/1997 | Subler et al. | |
| 5,675,507 A | 10/1997 | Bobo, II | |
| 5,675,734 A | 10/1997 | Hair | |
| 5,677,955 A | 10/1997 | Doggett et al. | |
| 5,696,825 A * | 12/1997 | Johnson et al. | 380/25 |
| 5,727,002 A | 3/1998 | Miller et al. | |
| 5,768,528 A | 6/1998 | Stumm | |
| 5,790,790 A | 8/1998 | Smith et al. | |
| 5,790,793 A | 8/1998 | Higley | |
| 5,802,520 A | 9/1998 | Jerkunica et al. | |
| 5,809,144 A | 9/1998 | Sirbu et al. | |
| 5,852,714 A | 12/1998 | Tseng et al. | |
| 5,852,800 A | 12/1998 | Modeste et al. | |
| 5,857,191 A | 1/1999 | Blackwell, Jr. et al. | |
| 5,870,552 A | 2/1999 | Dozier et al. | |
| 5,872,917 A | 2/1999 | Hellman | |
| 5,878,219 A | 3/1999 | Vance, Jr. et al. | |
| 6,061,448 A * | 5/2000 | Smith et al. | 380/21 |
| 6,161,181 A * | 12/2000 | Haynes et al. | 713/170 |

* cited by examiner

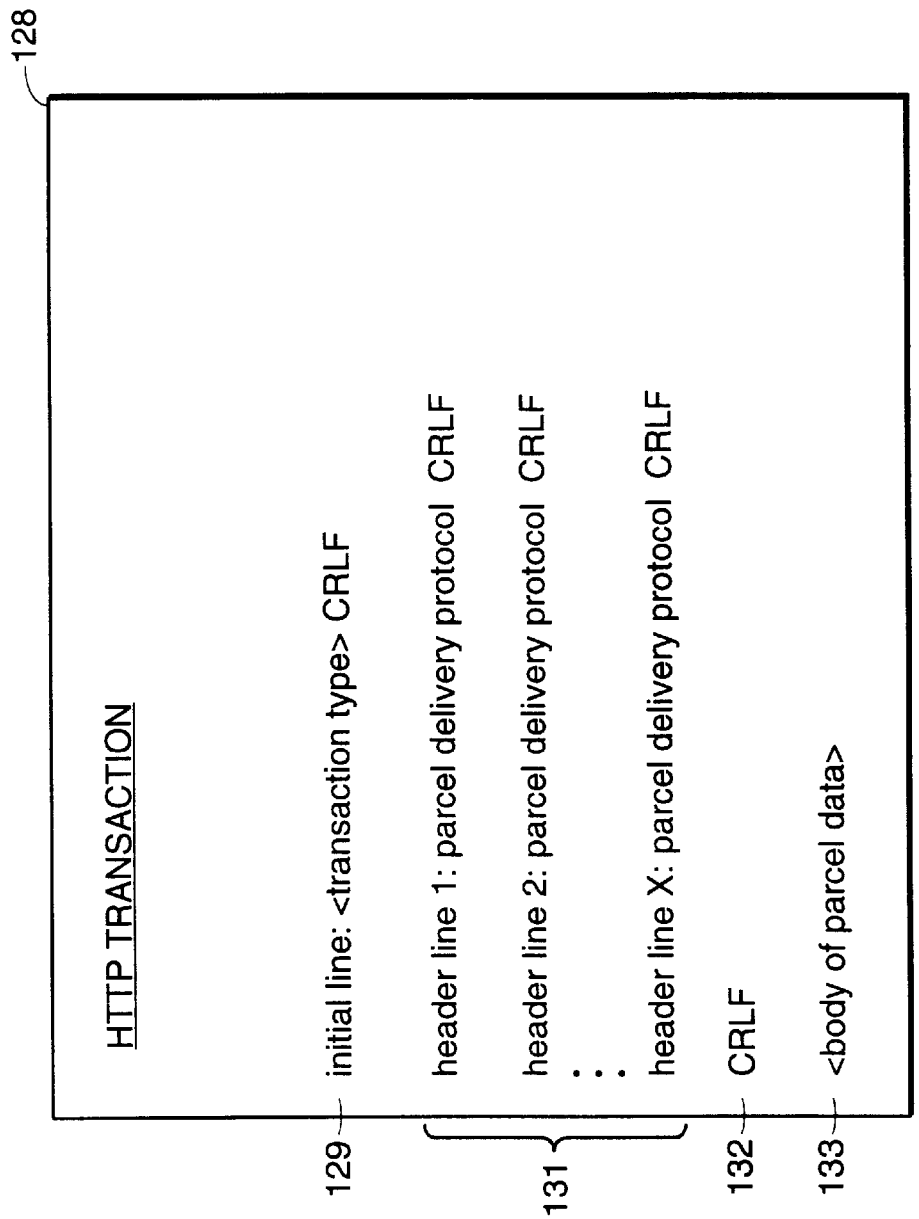

METHOD AND APPARATUS FOR DELIVERING ELECTRONIC DATA THROUGH A PROXY SERVER

RELATED APPLICATION

This application is a continuation-in-part of U.S. patent application, Ser. No. 09/258,609 filed Feb. 26, 1998.

FIELD OF THE INVENTION

The invention relates generally to the transfer of digital information from a sending system to a receiving system over a network. More specifically, the invention relates to an electronic document delivery system.

BACKGROUND

The Internet is an international collection of interconnected networks currently providing connectivity among millions of computer systems. One part of the Internet is the World Wide Web ("Web"), a graphics and sound-oriented technology used by computer systems to access a vast variety of digital information, e.g., files, documents, images, and sounds, stored on other computer systems, called "Web sites" (or "Web servers"). A Web site consists of electronic pages or documents called "Web pages."

Computer system users can view digital information at Web sites through a graphical user interface produced by executing client software called a "browser." Examples of commercially available Web browsers include Netscape Navigator™ and Microsoft Internet Explorer™. Web browsers use a variety of standardized methods (i.e., protocols) for addressing and communicating with Web servers. A common protocol for publishing and viewing linked text documents is HyperText Transfer Protocol (HTTP).

To access a Web page at a Web server, a computer system user enters the address of the Web page, called an Uniform Resource Locator (URL), in an address box provided by the Web browser. The URL can specify the location of a Web server or a file on a Web server. An accessed Web page can include any combination of text, graphics, audio, and video information (e.g., images, motion pictures, animation, etc.). Often, the accessed Web page has links, called hyperlinks, to documents at other Web pages on the Web. Also, an accessed Web page can invoke execution of an application program.

The development of the Web has enabled computer users to exchange messages and documents both locally and across the world. One popular form of network communication among Web users is electronic mail (e-mail). Most e-mail communication between users are short messages. Occasionally, an e-mail message may have an attachment, which is a file that is transmitted with the message. This file can be one of many formats, e.g., text, graphics, executable software, etc. E-mail systems, however, typically limit the size of e-mail messages. Attachments beyond this size limit need to be broken into smaller files and reconstructed by the recipient, an inconvenience and task beyond the ken of many e-mail users. Consequently, e-mail may not be a practical medium for transmitting formatted documents because of the typically large size of such documents. Other protocols, such as HTTP and FTP (file-transfer protocol), are able to transfer large files, but interruptions on the network can require repeated transfer attempts to successfully transfer a complete file.

The problem of delivering large documents across the network has led to the development of electronic document delivery systems. One electronic document delivery system is described in U.S. Pat. No. 5,790,790, issued to Smith et al. This delivery system includes a server interposed between sending and receiving computers. The sending system transmits the document to the server, and the server transmits a notification to the receiving system after receiving the full document. This notification includes a direct reference to the forwarded and stored document on the server. The receiving system uses the direct reference to locate and download the document from the server.

One drawback of this delivery system, however, is that notification occurs after completely transferring the document. As a result, the server must receive the entire document before sending a notification to the intended recipient. However, network failure at one of multiple points in the delivery system can prevent the notification from reaching the receiving system. For one, the server may never receive the entire document and, therefore, never issue a notification to the receiving system. Second, the connection between the server and the receiving system may fail, and the receiving system may not receive the notification issued by the server. In each instance, the receiving system remains unaware that the sending system is attempting to send a document. In the latter instance, the server may have successfully received the document, but the receiving system, without a notification, neither knows to retrieve the document nor where to find it.

SUMMARY

The invention features an electronic parcel delivery system for delivering digital information between computer systems over a network. In one aspect, the system includes a server system connected to the network. The server system stores digital information received over the network. The digital information can represent a parcel, a document, an image, executable software, an audio file, etc. A sending system connected to the network includes digital information representing an electronic document designated for delivery to the receiving system. The sending system also includes a processor executing encryption software to encode the document before transmitting the document on the network. A server system is connected to the network to receive the encoded document. The server system comprises a processor that executes decryption software to decode the document encoded by the sending system and executes encryption software to encode the decoded document before delivering the document to the receiving system.

BRIEF DESCRIPTION OF THE DRAWINGS

The invention is pointed out with particularity in the appended claims. The above and further advantages of the invention may be better understood by referring to the following description in conjunction with the accompanying drawings, in which:

FIG. 10 illustrates a format and content of an HTTP transaction 128 when used to transmit a parcel through an HTTP proxy server;

DESCRIPTION OF THE INVENTION

Figure 1:
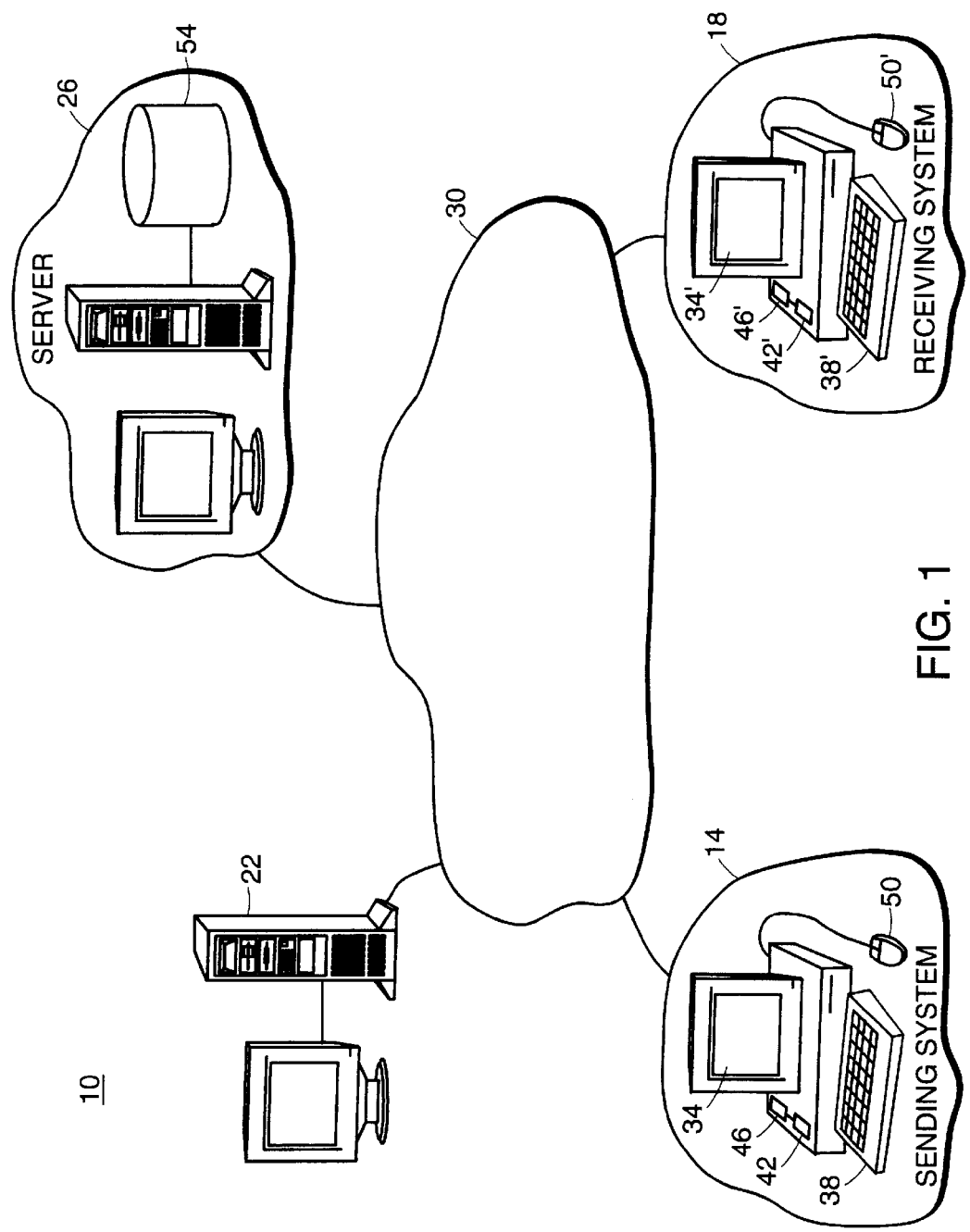
FIG. 1 is a diagram of an embodiment of a electronic parcel delivery system according to the principles of the invention, the delivery system including a sending system in communication with a receiving system via a server system.

FIG. 1 shows an embodiment of an electronic parcel delivery system 10 for electronically delivering any size and type of file (e.g., binary digital information, text, documents, parcels, multimedia content, video, audio, digital images, software, source code, folders, etc.) over a network 30 according to the principles of the invention. The parcel delivery system 10 includes a sending computer system 14, a receiving computer system 18, and server systems 22 and 26 connected to the network 30. It is to be understood that more than one sending system and receiving system may be connected to the network 30. The network 30 can be, for example, a local-area network (LAN), an Intranet, or a wide area network (WAN) such as the Internet or the World Wide Web.

Each of the sending, receiving, and server systems can be connected to the network 30 through a variety of connections including standard telephone lines, LAN or WAN links (e.g., T1, T3, 56kb, X.25), broadband connections (ISDN, Frame Relay, ATM), and wireless connections. The connections can be established using a variety of communication protocols (e.g., HTTP, TCP/IP, IPX, SPX, NetBIOS, Ethernet, RS232, and direct asynchronous connections).

The sending and receiving systems 14, 18 can be any personal computer (e.g., 286, 386, 486, Pentium, Pentium II), thin-client device, Macintosh computer, Windows-based terminal, Network Computer, wireless device, information appliance, RISC Power PC, X-device, workstation, mini computer, main frame computer, or other computing device having a graphical user interface. Windows-oriented platforms supported by the sending and receiving systems 14, 18 can include Windows 3.x, Windows 95, Windows 98, Windows NT 3.51, Windows NT 4.0, Windows CE, Windows CE for Windows Based Terminals, Macintosh, Java, and Unix. The sending and receiving systems 14, 18 can include a display screen 34, 34', a keyboard 38, 38', memory 42, 42', a processor 46, 46', and a mouse 50, 50', respectively.

Each server system 22, 26 can be any computing system able to operate as a Web server, communicate according to the HTTP protocol, maintain Web pages, process URLs, and control access to other portions of the network 30 (e.g., workstations, storage systems, printers) or to other networks. The server system 22 can also operate as an e-mail server for exchanging e-mail messages between the sending and receiving systems 14, 18. The server system 26 includes a storage device 54 for storing digital information received from sending systems and destined for subsequent transmission to receiving systems. The storage device 54 can be persistent storage, such as a hard-drive device, or volatile storage, such as dynamic RAM.

Figure 8:
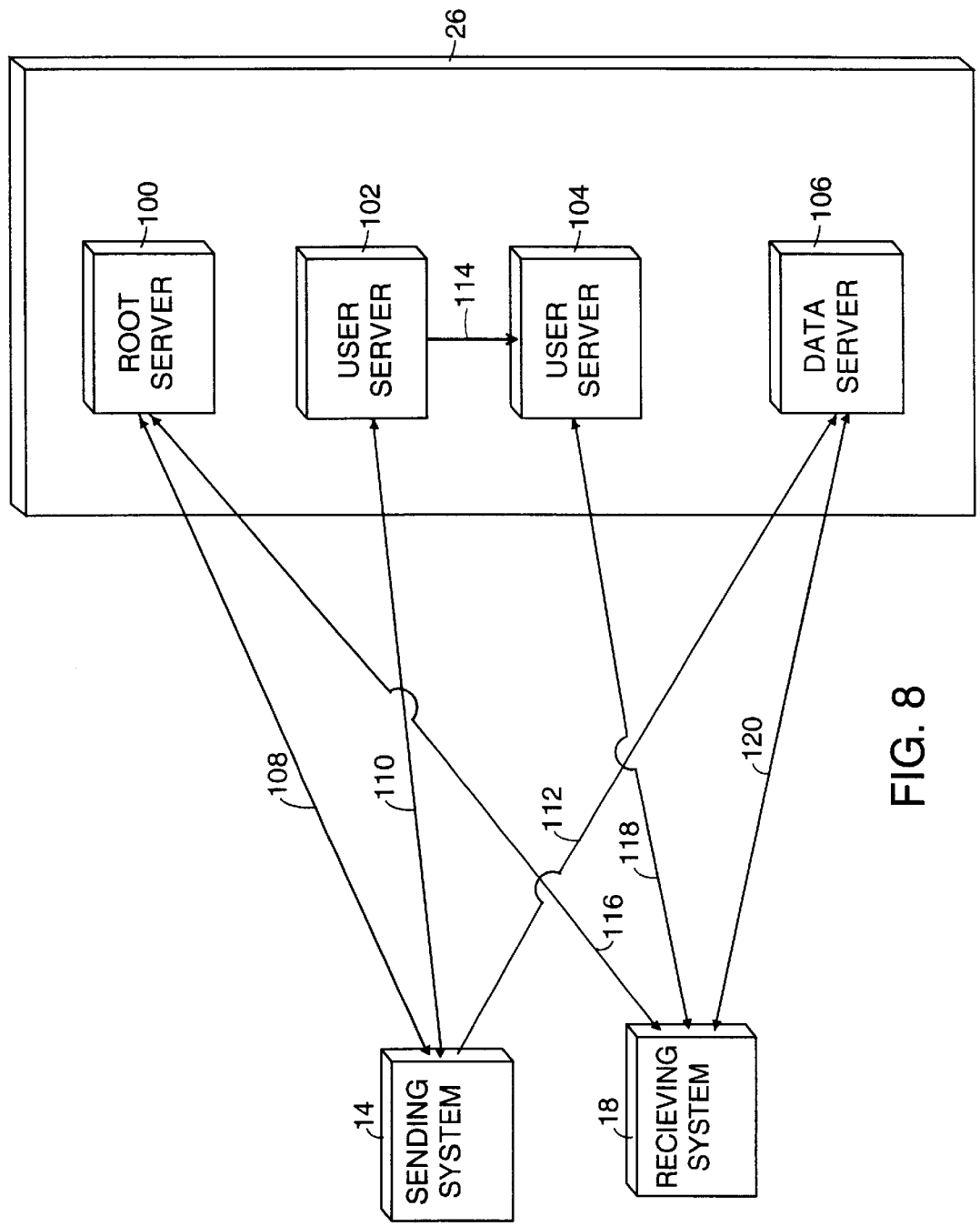
FIG. 8 is a diagram of an embodiment of a group of servers acting logically as the server system of the invention.

The server system 26 can include a group of server computer systems logically acting as a single server system and organized in a scalable architecture (see FIG. 8).

The server system 26 and the Web server 22 provide the above-described electronic parcel delivery service between sending and receiving systems according to the principles of the invention. Application software installed on the sending system 14 (hereafter client software) and on the server system 26 performs the parcel delivery service functions. The client software can be installed on receiving system 18, although this is not necessary for the receiving system to receive parcels. Upon installation, the client software collects proxy and protocol information from the configurations of Web browsers installed on the sending system 14 or receiving system 18. This information indicates whether a proxy is necessary to transmit parcels onto the network 30 and the necessary protocol (e.g., HTTP) to use. According to this collected information, the client software automatically configures the proxy and sets the protocol in the configuration files on the sending system 14 or receiving system 18. If the client software determines that sending system 14 does not have any installed Web browsers, then the proxy and protocol remain set at default values, namely "no proxy" and "TCP/IP," respectively.

When launched, the client-side software communicates with the server-side software. The client-side software provides the functionality for sending and receiving parcels. Consequently, the roles of the sending and receiving systems 14, 18 can reverse; senders may become receivers and receivers, senders. The server system 26 operates as a warehouse for received, but undelivered parcels.

The parcel delivery service of the invention provides senders and receivers a variety of services. These services described below, include data streaming, transmission interruptibility, data encryption and compression, parcel tracking, and parcel canceling. The sending and receiving systems 14, 18 can employ at least two techniques for accessing the parcel delivery service: (1) by executing the client software; and (2) by executing a web browser, e.g., Netscape Navigator™ TM or Microsoft Internet Explorer™. Executing the client software brings the senders and receivers into communication with the server-side software executing on the server system 26; executing the browser brings the senders and receivers to a common-entry web page (e.g., a home page) on the server system 26.

Upon accessing the server system 26, the senders and receivers are presented a variety of graphical windows through which the senders and receivers perform the desired parcel sending and receiving operations. These windows are described below in connection with FIG. 3. Although described with respect to Web pages and graphical windows, the principles of the invention are not limited to the context of the World Wide Web, Web pages, and graphical windows. For example, senders and receivers can operate in a non-graphical environment, entering command-line operations according to protocols such as the file transfer protocol to send parcels to and obtain file directories from the server system 26.

To start the parcel delivery service via the client software, the senders and receivers can double-click with a mouse on a graphical, desktop icon representing the client software. An alternative method for sending a parcel is to drag-and-drop a graphical representation of that parcel onto the icon. To start the parcel delivery service via the web browser, users of the sending and receiving systems 14, 18 can double-click on a graphical, desktop icon representing the browser and navigate to the URL associated with the common-entry web page. Alternatively, in accordance with the principles of one embodiment of the invention, the receiver of a parcel notification can click on a hyperlink embedded in the notification. This hyperlink causes the browser to launch and navigate to the common-entry web page.

Figure 2:
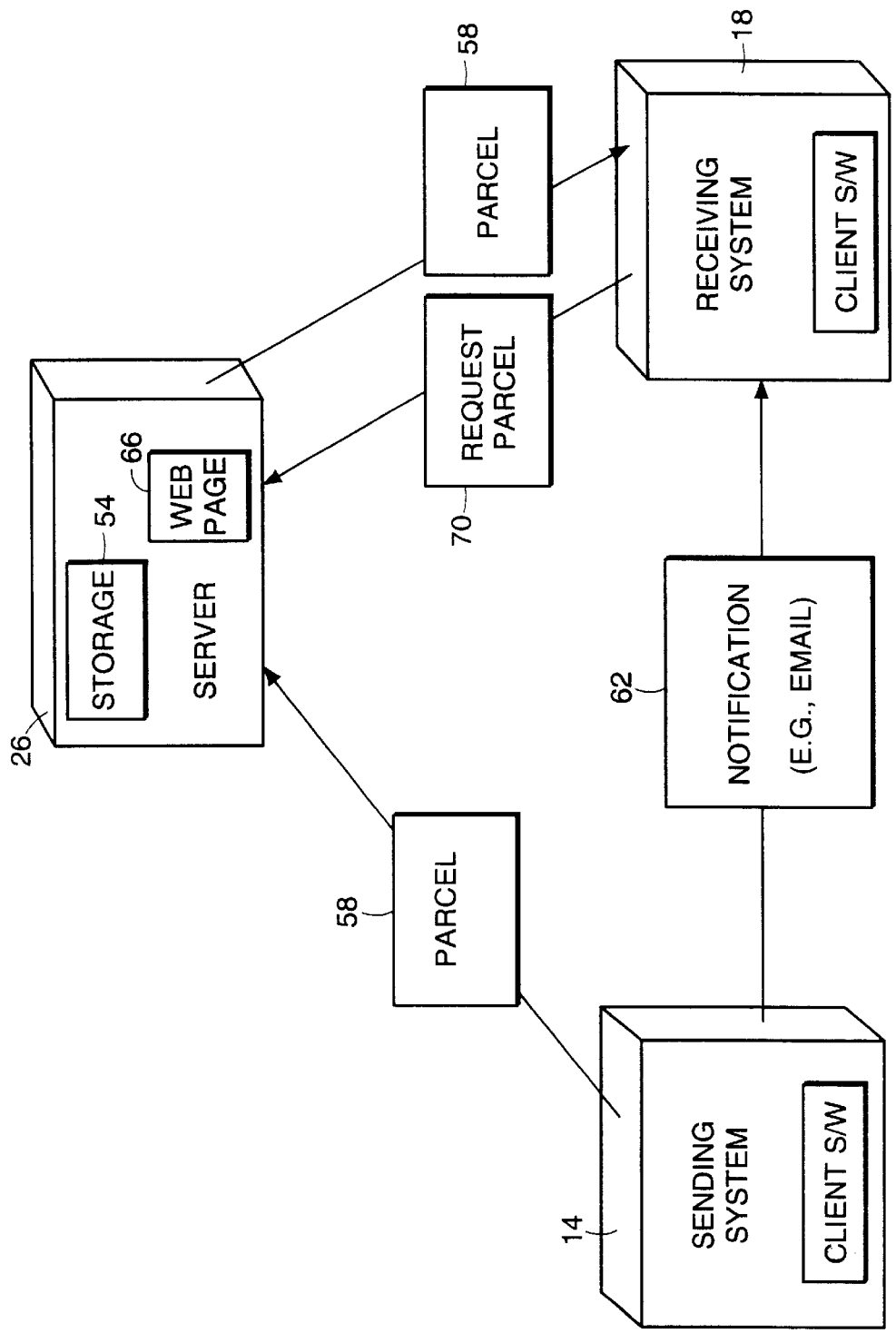
FIG. 2 is a diagram of an embodiment of the delivery system wherein the sending system transmits a parcel to the server system and a notification to the receiving system in accordance with the principles of the invention.

FIG. 2 shows general operation of the parcel delivery system 10 of the invention. The sending system 14 transmits digital information 58, here referred to as a parcel, to the server system 26 and a notification 62 to the receiving system 18. The transmission of the parcel 58 and notification 62 can occur concurrently. In other embodiments, the sending system 14 can issue the notification 62 before transmitting the parcel 58 or after successfully transmitting the complete parcel 58 to the server system 26. The notification 62 can be automatically or manually generated, whether before, after, or concurrently with transmission of the parcel 58.

The notification 62 signifies to the receiving system 18 that the sending system 14 has transmitted a parcel to the server system 26 intended for the receiving system 18. An e-mail message, for example, can serve as the notification 62. An advantage to using e-mail for notifications is that the sending system 14 can be assured of the on-line availability of the receiving system 18. Typical e-mail services can report to senders that particular receivers have received the e-mail message. Some e-mail services can also inform senders that the particular receiver has read that e-mail message. These e-mail capabilities, coupled with the capability of canceling delivery, can help reduce costs for distributing parcels by avoiding parcel deliveries to unavailable receivers.

In one embodiment, the notification 62 can be a brief message, such as "You have a parcel." If the user is familiar with the parcel delivery system 10 and knows the location of the common-entry page 66 (or, for example, has recorded the location as a bookmark in the Web browser), this notification indicating that the sending system 14 has sent the parcel, without more, may be sufficient.

In another embodiment, the notification 62 can also include a resource locator (e.g., an URL) addressing the common-entry page 66 on the server system 26. This resource locator can operate as a hyperlink that launches the web browser and navigates to the common-entry page 66 with a click of the mouse. Alternatively, the receiving system 18 can manually launch the browser and enter the URL corresponding to the common entry page 66.

By having the sending system 14 notify the receiving system 18, rather than the server system 26, the receiving system 18 acquires an earlier notification of the imminent delivery of a parcel. Consequently, the receiving system 18 can take advantage of data streaming capabilities of the parcel delivery service provided by the server system 26, described later in the description, by requesting the parcel 58 while the parcel 58 is not yet completely transmitted from the sending system 14 to the server system 26.

The server system 26 can store the parcel 58 in the storage system 54. In response to the notification 62, the receiving system 18 can access the server system 26 (e.g., at the common-entry page 66) and request 70 the parcel 58. This request 70 can be automatically generated by software installed on the receiving system 18 or deliberately initiated as described above. The server system 26 can then download the parcel 58 to the receiving system 18.

Figure 3:
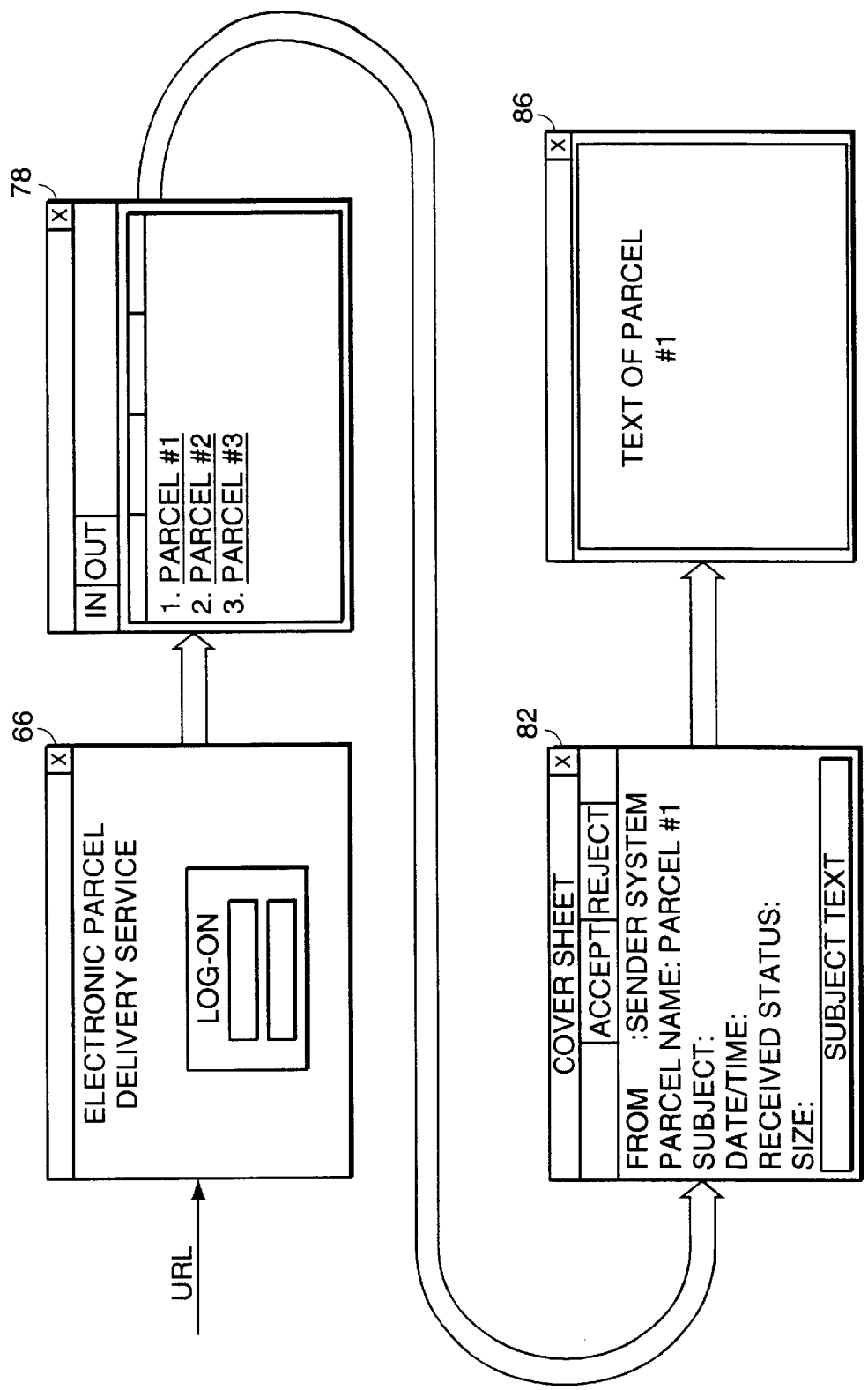
FIG. 3 is a diagram of an exemplary embodiment of graphical windows presented to the receiving system when accessing the parcel stored on the server system.

To obtain the parcel 58, the receiving system 18 can access from the server system 26 (e.g., via the common-entry page 66) and then traverse a sequence of graphical windows as shown in FIG. 3. The windows produce a graphical user interface that can lead receiver the access the parcel 58. As noted above, the page 66 can be manually or automatically visited. Downloading the page 66 to the receiving system 18 can cause execution of a Common Gateway Interface (CGI) script. The script can require log-on authentication of the receiving system user and prompt the user for log-on information 72, such as a user-name and a password.

After successful authentication, a second window 78 presents the user with a status of parcels received ("inbox") and sent ("outbox") by that user. By selecting the "inbox," the user can obtain a list of parcels, previously and presently received, and information about those parcels. The information can include the size of each parcel and a status whether the user has opened that parcel. The user can select one of the listed parcels by double clicking on the desired parcel identifier. In FIG. 3, the window 78 indicates that the user has three parcels.

If, for example, the user selects parcel #1, then the next displayed window is a cover sheet 82 that provides information about attributes of the selected parcel, such as the identity of the sending system, the name of the parcel, the time sent, and the parcel size. The cover sheet 82 gives the receiving system user an opportunity to accept or reject delivery of the parcel. The receiving system user can view the attribute information, decide to refuse delivery, and consequently reject the parcel. This feature enables the user to avoid downloading oversized files, unwanted information, suspicious files, or transmissions from unknown or unwanted senders.

The cover sheet 82 can also include a resource locator, here "file," for obtaining the selected parcel. The resource locator can include parameters that indirectly reference the storage location of the digital information representing the selected parcel. One such parameter is an unique identifier associated with the selected parcel. Other parameters can include session information, such as the identification of the user and a session key. The server system 26 maintains a data structure (e.g., a database or a table) that maps parcel identifiers to the storage locations. A CGI script processes the parameters and accesses the data structure to identify the storage location of the selected parcel, obtain the stored parcel, and start streaming the digital information to the receiving system 18.

Data Streaming:

Data streaming involves uploading the parcel 58 to the server system 26 while downloading the parcel 58 to the receiving system 18. This process can reduce by almost half the amount of time for full delivery of the parcel 58. The time reduction occurs because the process of downloading the parcel to the receiving system 18 does not wait until the entire parcel arrives at the server system 26 from the sending system 14; the server system 26 can start transmitting upon receiving the digital information. Data streaming can occur automatically, provided the receiving system 18 is on-line. For embodiments in which the receiving system user can reject the parcel, the receiving system 18 can request the parcel 58 from the server system 26 before the server system 26 completely receives the parcel 58 to take advantage of data streaming.

If the receiver is not on-line when the sending system 14 transmits the parcel 58 to the server system 26, the transmission can continue until the entire parcel 58 is uploaded to the server system 26. The server system 26 then waits until the receiving system 18 comes on-line and requests the parcel 58 before downloading to the receiving system 18.

In one embodiment, the server system 26 deletes the digital information from the storage system 54 after successfully transmission to the receiving system 18. The receiving system 18 can return acknowledgments to the server system 26 upon receiving the digital information. By this process, the server system 26 can make efficient use of available storage and reduce the amount of storage needed for parcels awaiting delivery to receiving systems.

Interruptibility

In the event of an interruption in the transmission of the parcel 58 from the server system 26 to the receiving system 18, the server system 26 can resume transmission of the parcel 58, from the point of interruption after reestablishing the connection. In one embodiment, the receiving system 18 determines that point from the size of the parcel and the time of interruption. When the server system 26 initially sends the parcel 58 to the receiving system 18, the parcel includes a unique identifier that indicates the size of the parcel 58 to the receiving system 18. After the connection is reestablished, the receiving system 18 uses the parcel size and the time of interruption to request from the server system 26 only those portions of the parcel 58 not previously transmitted.

Security

The delivery system 10 of the invention provides security at various levels. At one level, the server system 26 can authenticate the user identities of the sending and receiving systems 14, 18. This authentication can include uniquely identifying the installations of the client software on the sending and receiving systems 14, 18. At another level, the delivery system 10 authenticates each delivery transaction. At another level, in preparation for transmission, the client software compresses and encrypts the digital information in real time. Also, the server system 26 compresses and encrypts the digital information in real-time while transmitting the parcel to the receiving system. At still another security level, the receiving system user can reject parcel deliveries rather than download from the server system 26.

The server system 26 can also operate as a certificate authority so that each sending and receiving system can be assured of the identity of the originator and recipient of the parcel. In the role as certificate authority, the server system 26 manages the encryption keys of users of sending and receiving systems.

Real Time Tracking:

After the sending system 14 initiates transmission of the parcel 58 to the receiving system 18, the sending system 14 can track the real-time progress of the parcel 58 through the network 30. Tracking information can include when the sending system 14 started transmitting the parcel 58 to the server system 26, the progress of uploading the parcel 58 to the server system 26 (or intermediate web server as described below), the status of the receiving system 18 (e.g., unregistered, off-line, on-line, etc.), the progress of downloading the parcel 58 to the receiving system, and the status of the received parcel (e.g., parcel being received, parcel moved to another location in memory, parcel delivered, parcel opened, time of opening, etc.). The server system 26 can verify that the receiving system 18 has received the parcel 58 using a signature uniquely identifying the receiving system 18 user and, when the receiving system 18 executes client software to access the server system 26, a unique identifier associated with that client software. The signature and unique identifier can accompany a returned acknowledgment from the receiving system 18 to securely signify that the receiving system 18 has received from the server system 26 the last bit of digital information pertaining to the parcel 58.

The server system 26 can record the progression of the transmission for the parcel 58 in a database, along with the signature and client software identification. The database can provide an audit trail for the sending and receiving systems 14, 18 to view. Accordingly, tracking provides the sending system 14 a mechanism for confirming receipt and subsequent use of parcel 58, a capability generally lacking in the trans-Internet communications.

Cancel delivery:

The sending system 14 can cancel delivery of the parcel anytime during the transmission of the parcel to the receiving system 18. The sending system 14 signals the server system 26 to stop the delivery. If the server system 26 has not started transmitting the parcel to the receiving system 18, then the server system 26 can forego forwarding the parcel or delete the parcel from the storage system 54. If the server system 26 has transmitted the parcel to the receiving system 18, then the server system 26 can forward the cancel signal to the receiving system 18. The client software on the receiving system 18 deletes the parcel upon receiving the cancel signal from the server system 26, provided the parcel 58 is incompletely received or is completely received, but still unopened. Conceivably, a completely delivered and opened parcel may be canceled, although permission by the receiving system user may be necessary to do so. Upon request by the sender, the server system 26 can recover any canceled deliveries, provided the digital information is still available (i.e., has not been overwritten).

Figure 4:
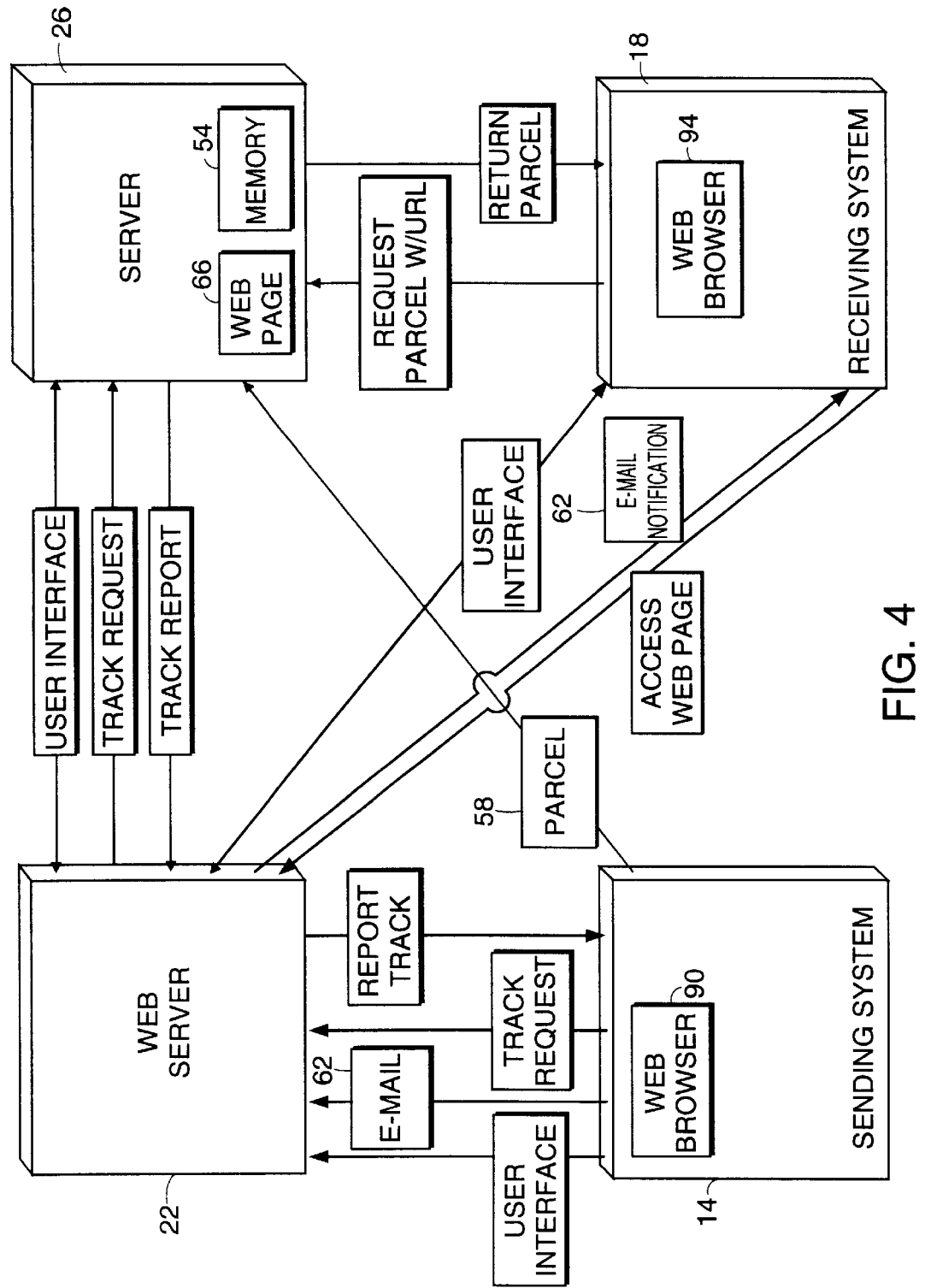
FIG. 4 is a diagram of an embodiment of the delivery system wherein the sending system communicates with a Web server, using a Web browser, to send the notification to the receiving system.

FIG. 4 shows another exemplary embodiment of the electronic parcel delivery system 10 of the invention, including the sending system 14, the receiving system 18, the server system 26, and a Web server 22. The sending and receiving systems 14, 18 are in communication with the Web server 22 and the server system 26, and the Web server 22 is in communication with the server system 26. Parcel 58 passes directly from the sending system 14 to the server system 26, and the server system 26 stores the parcel 58 in the storage system 54. The sending system 14 sends the notification 62 to the Web server 22, and the Web server 22 provides the notification 62 to the receiving system 18. The notification 62 operates similarly to the notification 62 described in the embodiment of FIG. 2.

In this embodiment, the sending and receiving systems 14, 18 run the Web browsers 90, 94 to access the common-entry page 66 on the server system 26. The Web server 22 transmits the graphical user interfaces between the sending and receiving systems 14, 18, and the server system 26. Tracking requests and reports between the sending and server systems 14, 26 also pass through the Web server 22.

Figure 5:
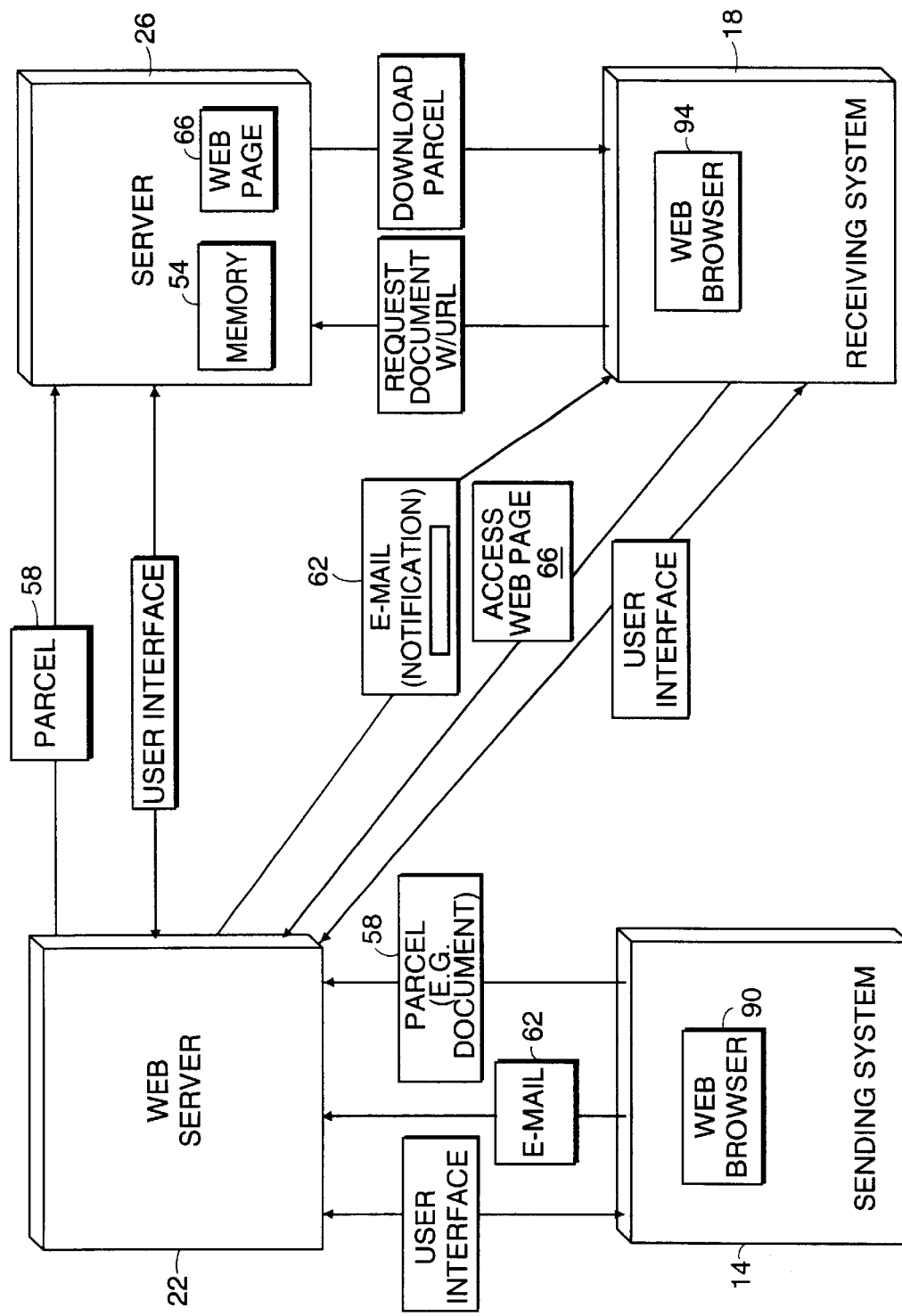
FIG. 5 is a diagram of an embodiment of the delivery system wherein the sending system communicates with a Web server, using a web browser, to send the notification to the receiving system and the parcel to the server system.

FIG. 5 shows another exemplary embodiment of the parcel delivery system 10 of the invention similar to the embodiment shown in FIG. 4. A difference from the FIG. 4 embodiment is that the sending system 14 transmits the parcel 58 to the Web server 22 instead of directly to the server system 26. The Web server 22 then forwards the parcel 58 to the server system 26.

Figure 6:
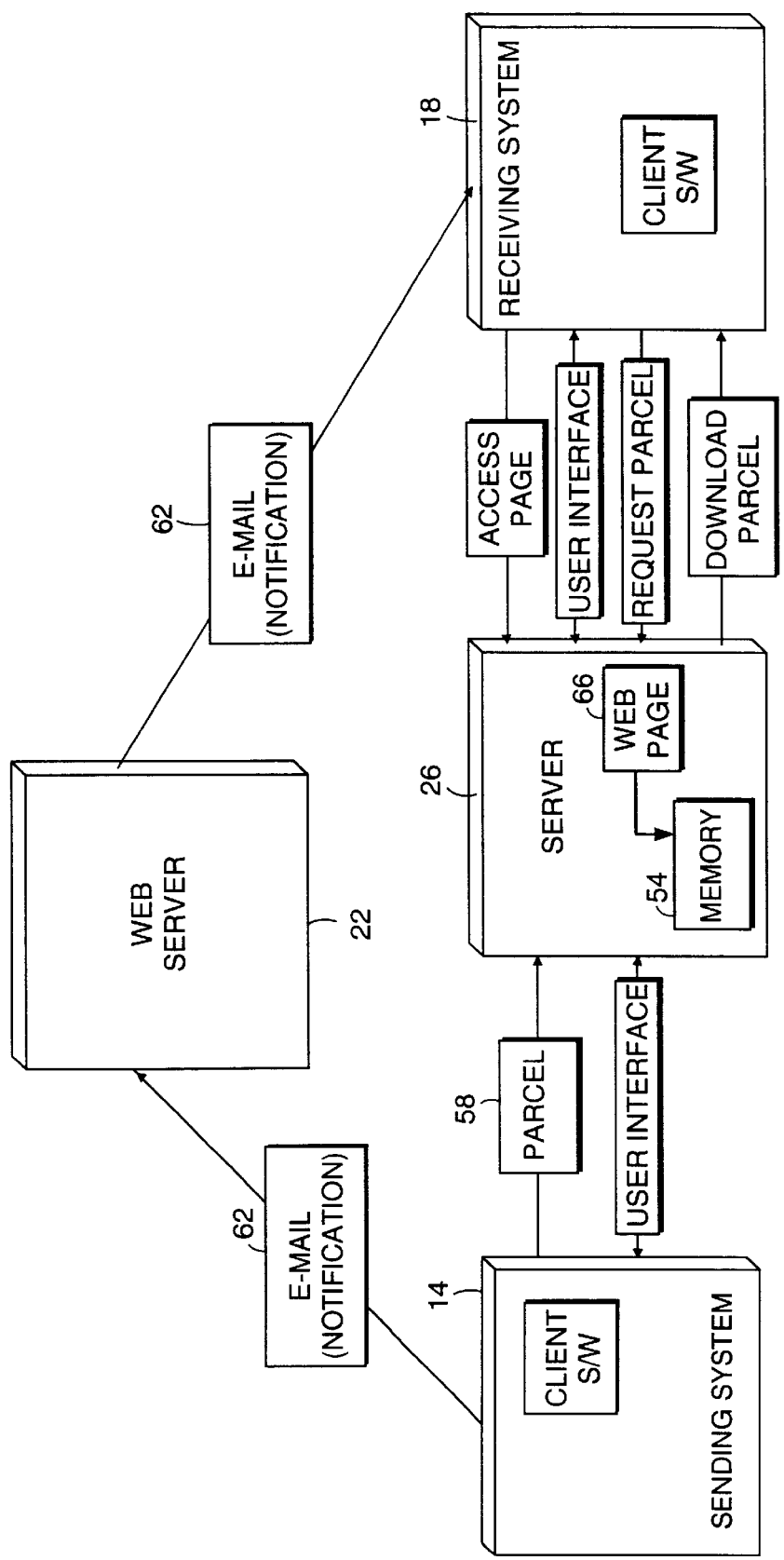
FIG. 6 is a diagram of an embodiment of the delivery system wherein the sending system communicates with a Web server using client software to send the notification to the receiving system, and the receiving system communicates with the server system using client software to obtain the parcel.

FIG. 6 shows another exemplary embodiment of the parcel delivery system 10 wherein the sending and receiving systems 14, 18 each execute the client software to access the server-side software executing on the server system 26. Like the embodiment of FIG. 4, the sending system 14 transmits the parcel 58 directly to the server system 26 and the notification 62 to the Web server 22. The Web server 22 notifies the receiving system 18 of the parcel, and the receiving system 18, in response, obtains the parcel 58 from the server system 26. In contrast to the embodiment of FIG. 4, the user interfaces, tracking requests, and tracking reports pass directly between the sending system 14 (or receiving system 18) and the server system 26, rather than through the Web server 22.

In other embodiments, the sending system 14 can execute the Web browser 90, while the receiving system 18 executes the client software; or conversely, the sending system 14 can execute the client software while the receiving system executes the Web browser 94. Generally, in such embodiments, the client software communicates directly with the server system 26 to exchange information, such as the user interface and the tracking information, and the Web browser communicates indirectly with the server system 26 through the Web server 22.

Figure 7:
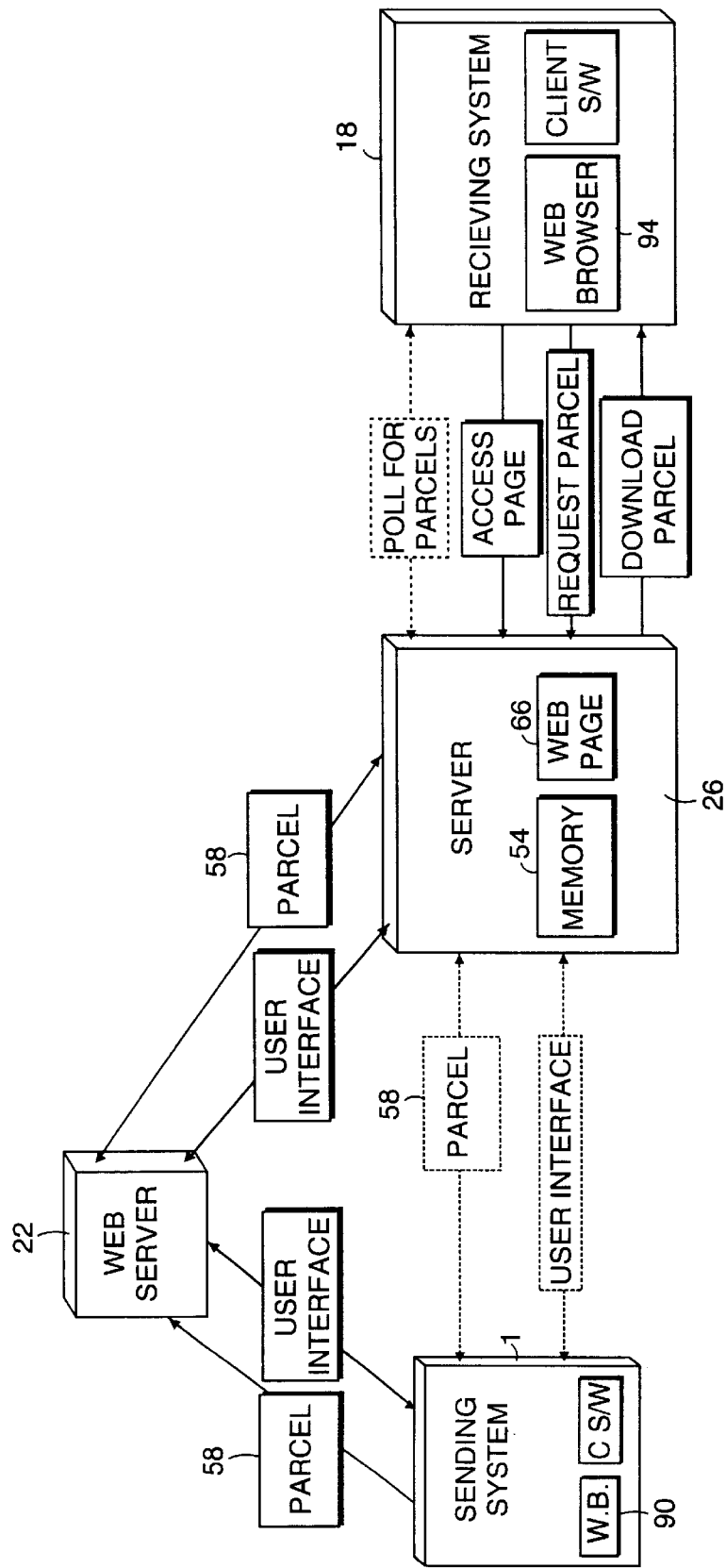
FIG. 7 is a diagram of an embodiment of the parcel delivery system wherein the sending system delivers the parcel to the receiving system without notifying the receiving system that a parcel has been transmitted.

FIG. 7 shows still another embodiment of the parcel delivery system 10 wherein the sending system 14 delivers the parcel 58 to the server system 26 without any notification mechanism to alert the receiving system 18 that the sending system 14 has sent the parcel 58. The sending system 14 can transmit the parcel 58 to the server system 26 directly or through the Web server 22. When the sending system 14 executes the client software, the user interface and the parcel 58 are communicated directly to the server system 26. When the sending system 14 executes the Web browser 90, the parcel and user interface are communicated through the Web server 22.

When the receiving system 18 goes on-line, an URL is presented to the user in a graphical user interface by which the receiving system user can obtain the parcel. Alternatively, the receiving system 18 can periodically poll the server system 26 to determine if any new parcel deliveries have occurred.

Scalable Server Architecture

FIG. 8 shows one embodiment of an exemplary group of servers acting logically as the server system 26. The group of servers includes a root server 100, one or more user servers 102, 104, and one or more data servers 106. The root server 100 tracks each user server 102, 104 and data server 106 in the group. The root server 100 can also maintain information about other remote server systems or groups of server systems that can provide the electronic parcel service in conjunction with the server system 26.

The user of the sending system 14 and user of the receiving system 18 are each assigned to a user server when the users first register with the server system 26. The root server 100 selects the user server to which each user is assigned. For example, the root server 100 can assign the sending system user to user server 102 and the receiving system user to user system 104. When the sending system 14 subsequently contacts the server system 26 to initiate delivery of a parcel, the sending system 14 obtains the identity of the assigned user server 102 from the root server 100 (arrow 108). The sending system 14 sends parcel information, including the name of the intended receiver, to the user server 102 (arrow 110).

In response to the communication from the sending system 14, the user server 102 allocates one of the data servers 106 to store that parcel and notifies the sending system 14 of the allocation. The sending system 14 can then transmit the parcel directly to the allocated data server 106 via link 112. The assigned user server 102 provides, via link 114, each other user server 104 in the group (and remote user servers) with the identity of the intended receiver of the parcel.

Upon logging on to the server system 26, the receiving system 18 obtains from the root server 100 the identity of the user server 104 assigned to the receiving system 18 (arrow 116). The receiving system 18 subsequently communicates with the user system 104 to determine that the new parcel is available on the data server 106 (arrow 118). The user system 104 was able to communicate this information to the receiving system 18 because the user system 102 had previously communicated the information to the user system 104. The user server 104 gives the receiver a session key with which the receiving system 18 contacts the data server 106 and retrieves the parcel (arrow 120). The data server 106 captures the transaction information as described above, which can be useful in preparing billing information.

Figure 9:
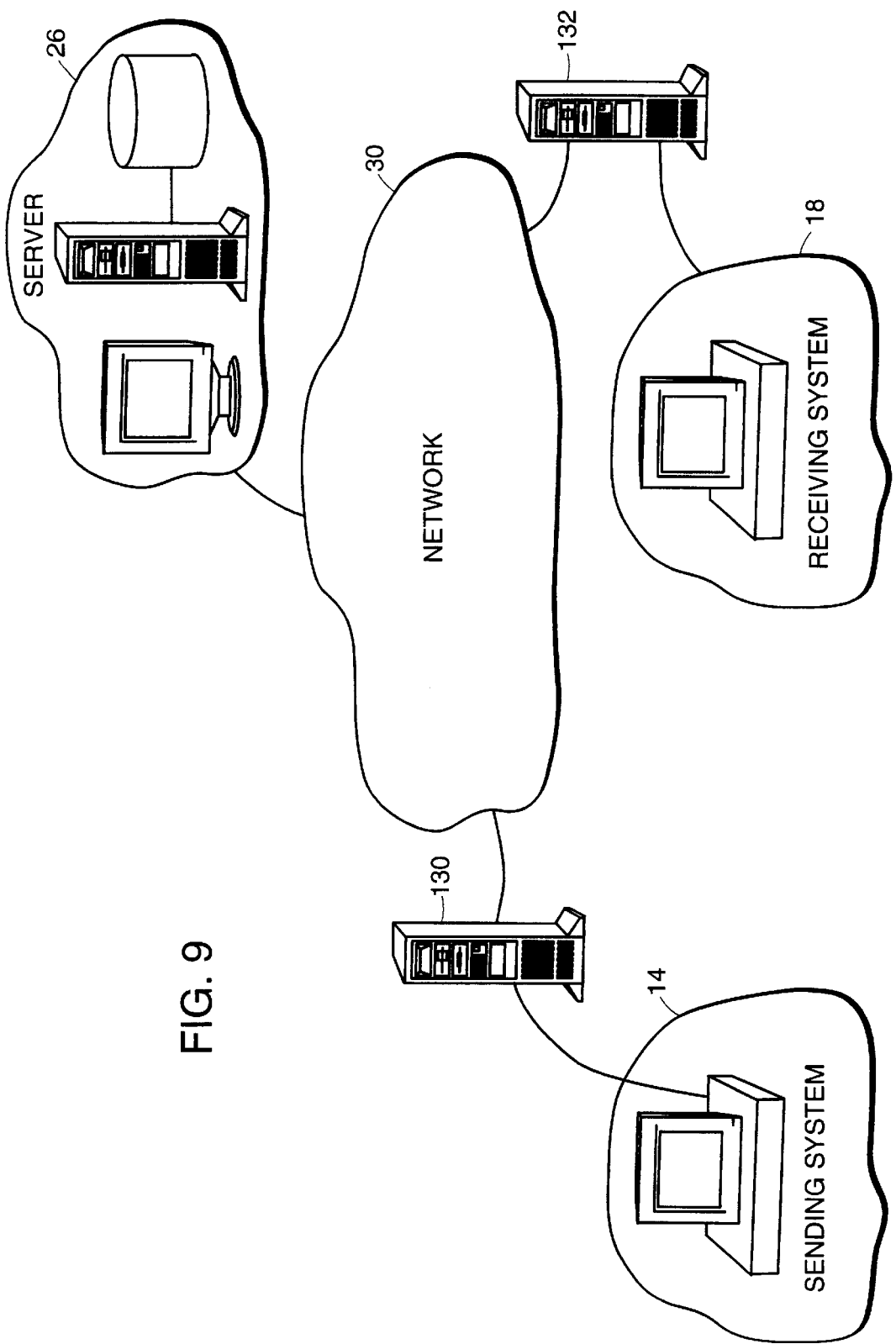
FIG. 9 is a diagram of an embodiment of the electronic parcel delivery system wherein proxy servers separate the sending and receiving systems from the network.

FIG. 9 illustrates an exemplary embodiment of the electronic parcel delivery system 10 in which proxy servers 130 and 132 are connected between the network 30 and the sending and receiving systems 14, 18, respectively. While shown in FIG. 9 as two distinct proxy servers 130, 132, in one embodiment the proxy servers 130, 132 can be the same proxy server. Each proxy server 130, 132 works in conjunction with a firewall to allow communications to and from the network 30 by the sending and receiving systems 14, 18, respectively. Consequently, for the sending and receiving systems 14, 18 to exchange parcels through the server system 26, such parcels must satisfy criteria established by the proxy servers 130, 132 to avoid being blocked from passing through the respective proxy server.

In one embodiment, the proxy servers 130, 132 are HTTP proxy servers, which specialize in HTTP messages (i.e., transactions). In general, the format of each HTTP transaction includes an initial line followed by zero or more header lines, an empty line (i.e., carriage return, line feed (CRLF)), and an optional message body. For example, the general format of an HTTP transaction is:

initial line (e.g., request or response transaction)
   Optional header line 1: value1 CRLF
   Optional header line 2: value2 CRLF . . .
   Optional header line X: valueX CRLF
   CRLF
   message body.

FIG. 10 illustrates an exemplary format and content of an exemplary HTTP transaction 128 for use in transmitting a parcel through an HTTP proxy server. The HTTP transaction 128 includes an initial line 129, one or more header lines 131, a blank line (CRLF) 132, and the digital information 133 associated with the transaction 128, e.g., representing a portion of the parcel being transmitted, parcel description, parcel commands, etc. The initial line 129 indicates the type of HTTP transaction, e.g., POST and GET commands. The header lines 131 include protocol information used by the sending, server, and receiving systems to direct the operation of the parcel delivery service. The parcel delivery service protocol specifies rules for conducting parcel delivery transactions such as, for example, authentication, uploading and downloading parcels, requesting a list of parcels that can be uploaded and downloaded, sending, receiving and tracking parcels, and performing commands, e.g., cancel delivery, mark parcel as open, mark parcel as moved.

Generally, parcels are large files or documents that cannot be completely transmitted to the server system 26 with a single HTTP transaction. Accordingly, for large parcels multiple HTTP transactions are typically necessary to transmit the entire parcel from the sending system 14 to the server system 26 or from the server system 26 to the receiving system 18. Each HTTP transaction transfers a portion of the parcel. For such HTTP transactions, the digital information 133 represents the parcel data included in the transaction that is being transmitted by the sending system 14 or requested by the receiving system 18.

In one embodiment, the digital information 133 is binary data. Where the proxy server objects to pure binary data, other embodiments have the sending system 14 or server system 26 convert the pure binary data into printable characters (e.g., by creating hexadecimal values for each byte). The receiver of the converted data, either the server system 26 or the receiving system 18, respectively, converts the printable characters back into pure binary data.

Figure 11A:
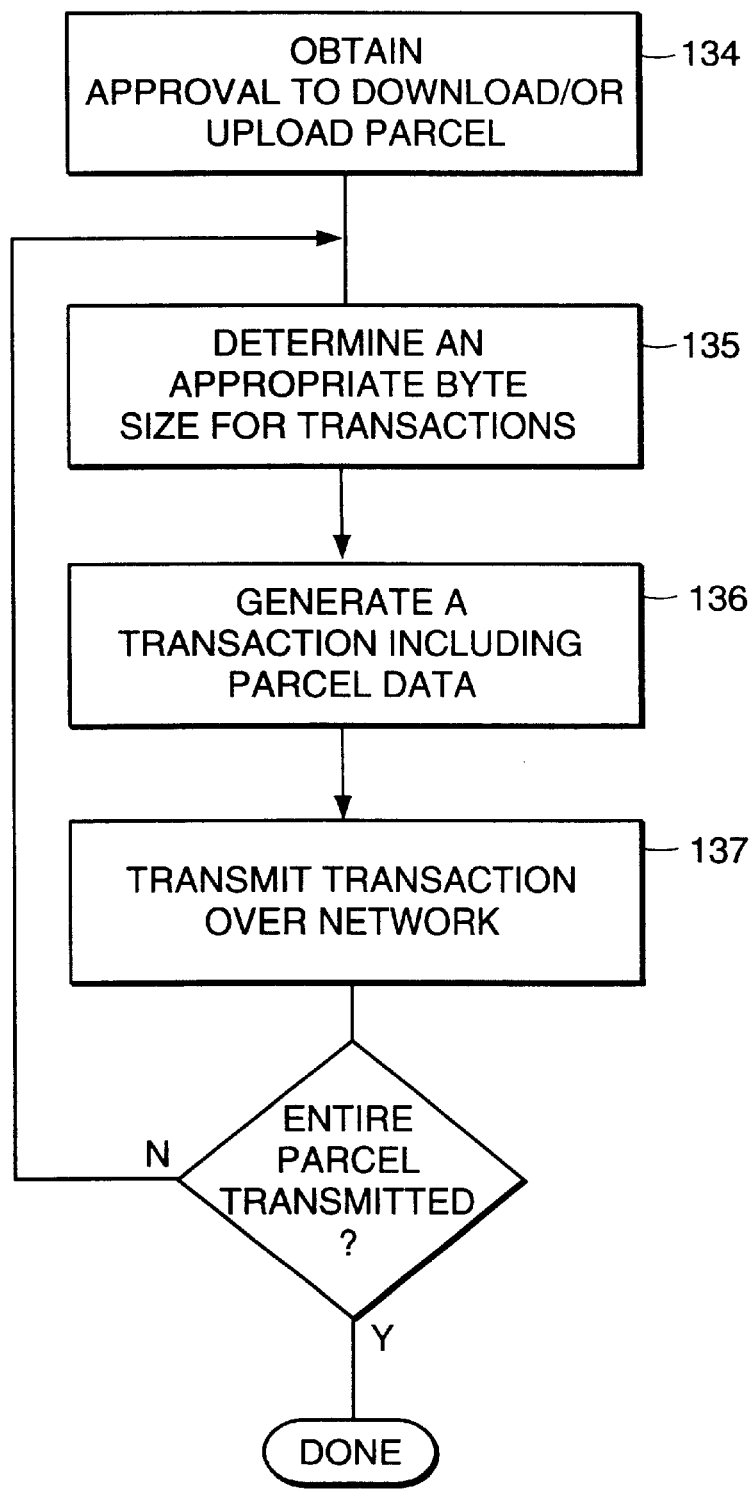
FIG. 11A illustrates an exemplary process by which the sending system 14 transmits a parcel to the server system 26.

FIG. 11A illustrates an exemplary process by which the sending system 14 transmits a parcel to the server system 26. In general, the client software executing on the sending system 14 follows a series of parcel delivery protocol steps until the sending system 14 obtains (step 134) approval from the server system 26 for uploading the parcel. The sending system 14 also determines (step 135) an appropriate byte size for transmitting transactions through the proxy server 130. Then the sending system 14 generates (step 136) a transaction that includes a portion of the parcel corresponding to the determined byte size. The sending system 14 transmits (step 137) that transaction to the server system 26. The process of steps 135, 136, and 137 repeat until the entire parcel passes to the server system 26.

The receiving system 18 follows a similar process when requesting a parcel from the server system 26. The client software executing on the receiving system 18 follows a series of parcel delivery protocol steps until the receiving system 18 obtains (step 134) approval from the server system 26 for downloading the parcel. Also, the receiving system 18 specifies (step 135) the appropriate byte size when requesting delivery of the parcel from the server system 26. The receiving system 18 generates (step 136) the transaction that the server system 26 fulfills by sending (step 137) a portion of the parcel corresponding to the determined byte size. The process of steps 135, 136, and 137 repeat until the entire parcel passes to the receiving system 18.

Figure 11B:
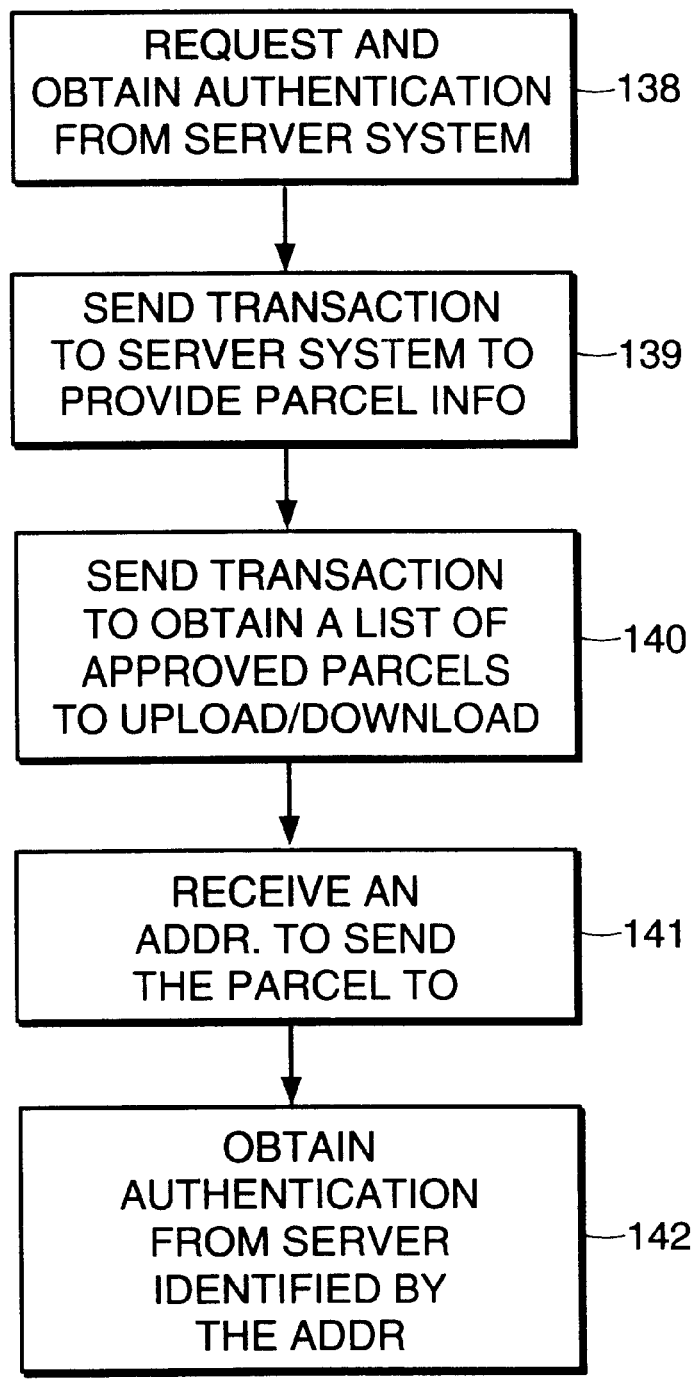
FIG. 11B is a flow diagram of an exemplary process by which the sending system or receiving system obtains approval from the server system for uploading or downloading the parcel.

FIG. 11B illustrates a series of parcel delivery protocol steps performed until the sending system 14 obtains approval from the server system 26 for uploading the parcel. The receiving system 18 follows a similar process when requesting a parcel for downloading from the server system 26. The sending system 14 issues (step 138) a transaction (e.g., an HTTP transaction) to the server system 26. This transaction requests authentication from the server system 26. The server system 26 authenticates the sending system 14 by ensuring that the sending system 14 has an account with the parcel delivery service. The server system 26 establishes such an account for the sending system user by having the user engage in a registration procedure. During registration, the sending system user provides personal information, such as name, address, credit card information, etc. to the server system 26 and the systems 14, 26 establish a password. The server system 26 responds to the authentication request from the sending system 14 by returning a session handle for use by the sending system 14 in subsequent transactions.

The sending system 14 then sends (step 139) a transaction to the server system 26 providing parcel information associated with one or more parcels that the sending system 14 wants to deliver through the server system 26. The parcel information can include parcel attributes (such as size, name, and parcel type), billing account to use, recipients, text message, etc. In response to this transaction, the server system 26 validates the parcel information. Upon successful validation, the server system 26 assigns a server for receiving the parcel. Also, the server system 26 notifies the assigned server to prepare for the pending parcel transfer and any server associated with the recipients designated in the parcel information.

The sending system 14 then issues (step 140) a transaction to get a list of those parcels that the server system 26 permits the sending system 14 to send. The server system 26 responds (step 141) with the list of parcels and the address of a server to which the sending system 14 is to send the parcel. In one embodiment, this address references the server system 26. In another embodiment, the address references another server system in the group of server systems.

Included in the response to the sending system 14 is an encrypted key that the sending system 14 uses for authentication with the server referenced by the address. When the referenced server system, e.g., server system 26, authenticates (step 142) the sending system 14 with the key, that server system 26 provides the sending system 14 with another session handle that is used for uploading the parcel from the sending system 14 to the server system 26.

Figure 11C:
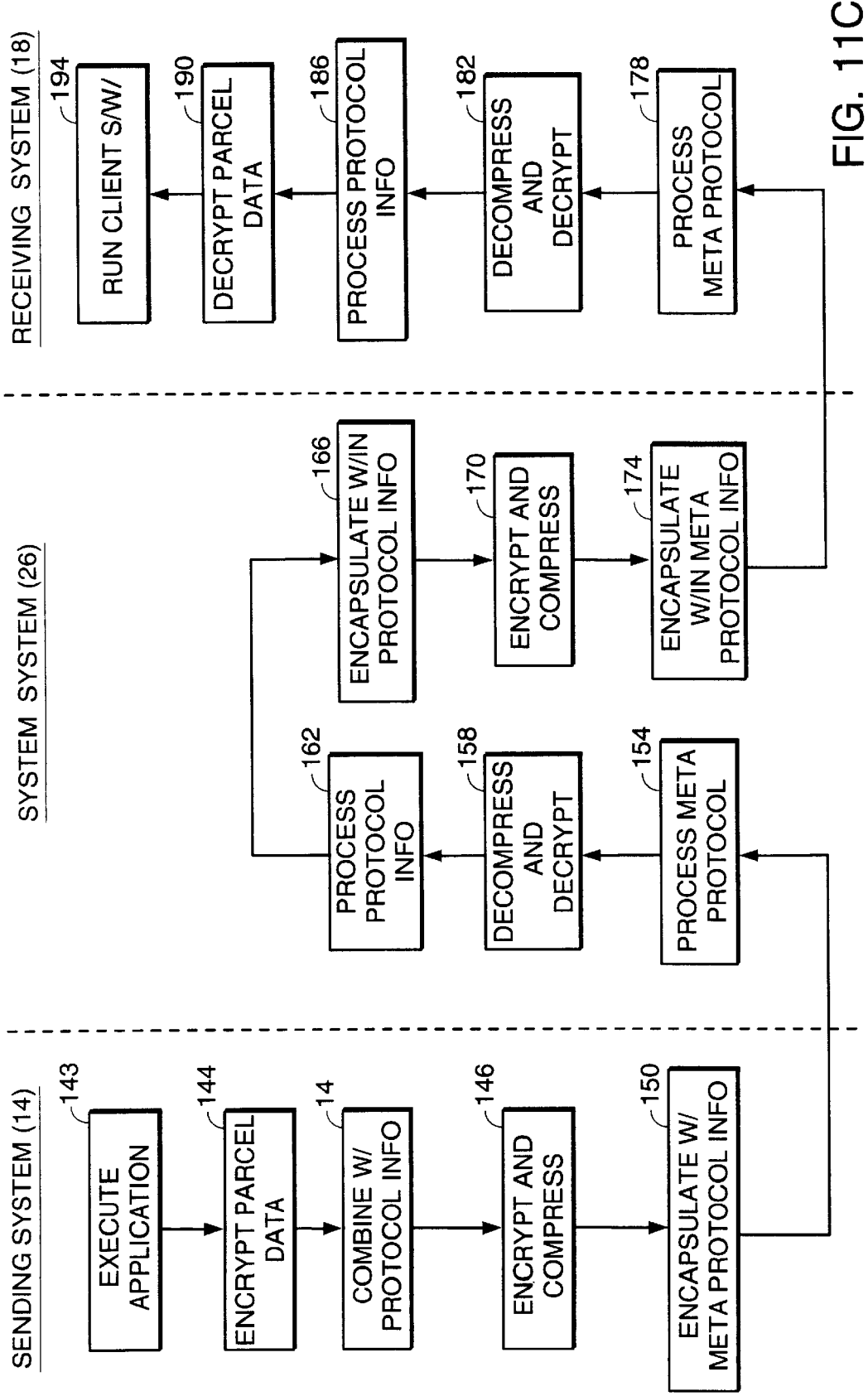
FIG. 11C is a flow diagram of an exemplary process by which the sending system prepares and transmits a parcel portion to the server system, and the server system prepares and transmits the parcel portion to the receiving system.

FIG. 11C illustrates an exemplary process by which the sending system 14 transmits a parcel to the server system 26, and by which the server system 26 transmits the parcel to the receiving system 18. The sending system 14 executes (step 143) the client software. In one embodiment, the sending system 14 includes encryption software for encrypting (step 144) parcel data of each parcel portion. The encryption software can employ any one or combination of asymmetric or symmetric encryption algorithms to encrypt the parcel data. If the server system 26 is acting as a certificate authority, then the server system 26 possesses each key used in the encryption process. If another entity is acting as a certificate authority, in addition to or instead of the server system 26, then the server system 26 does not possess the key or keys for decrypting this encryption, and therefore this encryption seals the parcel from discovery by the server system 26.

The sending system 26 then combines (step 145) the encrypted parcel data with parcel delivery protocol information described above. Before placing the encrypted and encapsulated parcel onto the network, the sending system may again encrypt and compress (step 146) the parcel data along with the protocol information using encryption software that the server system 26 can decipher. In one embodiment, the parcel data is excluded from encryption the second time. The compression reduces the required network bandwidth for conveying the parcel. The sending system 14 then encapsulates (step 150) the encrypted and compressed parcel delivery protocol information and parcel data within meta-protocol information, e.g., the HTTP protocol, to produce the transaction.

The sending system 14 transmits the transaction to the server system 26 and notifies the receiving system 18 as described above. The server system 26 receives the transaction and processes (step 154) the meta-protocol information in the transaction. The server system 26 then decompresses and decrypts (step 158) the result of step 154 to obtain the parcel delivery protocol information. In step 162, the server system 26 processes the parcel delivery protocol information accordingly. The server system 26 then stores the parcel data. Steps 143 to 162 repeat until the server system 26 receives the entire parcel from the sending system 14. The parcel remains stored at the server system 26 until the receiving system 18 requests the parcel or until a predetermined period elapses at which time the parcel is deleted.

In response to the notification from the sending system 14, the receiving system 18 executes the client software to access the parcel delivery service operating on the server system 26 as described above. The receiving system user provides logon information so that the server system 26 can authenticate the identity of the user. As with the sending system user, the server system 26 establishes an account for the receiving system user by having the user engage in a registration procedure during which the server system 26 obtains personal information about the receiving system user.

To transmit the parcel, transaction by transaction, the server system 26 combines (step 166) each portion of parcel data with parcel delivery protocol information. Then, the server system 26 encrypts and compresses (step 170) the parcel portion. The encryption algorithm used by the server system 26 can be the same or a different encryption algorithm as the encryption algorithm used by the sending system 14 in step 146. The use of different algorithms provides the flexibility to use the delivery system 10 across various international domains that can have varying restrictions on the type of encryption. The server system 26 then encapsulates the result of step 170 within meta-protocol information that enables the transaction to pass through the proxy server 132.

Upon obtaining the parcel portion, the receiving system 18 processes (step 178) the meta-protocol information accordingly. The receiving system 18 also decompresses and decrypts (step 182) the result of step 178 to obtain the parcel delivery protocol information. In step 186, the receiving system 18 processes the parcel delivery protocol information as directed by that information, and then decrypts (step 190) the parcel data in that transaction. The parcel data passes (step 194) to the client software running on the receiving system 18.

The electronic parcel delivery system 10 can deliver parcels of any size. Proxy servers in general, however, limit the amount of data that can pass through the firewall for a given transaction. Accordingly, the sending system 14 and receiving system 18 keep each transmitted or requested parcel portion within the size limit imposed by proxy servers. The number of parcel portions depends upon the overall size of the parcel and this size limit.

Figure 12:
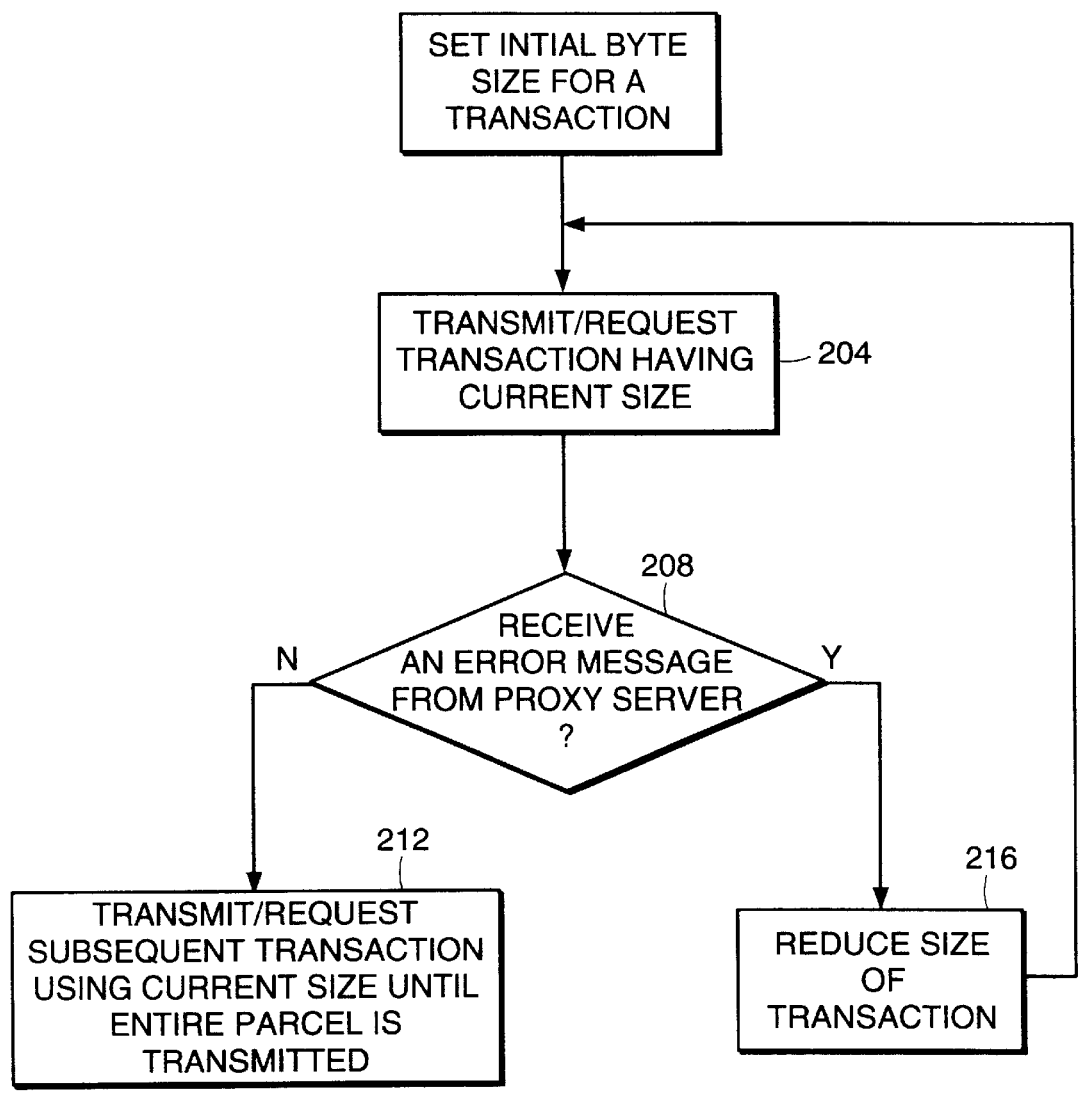
FIG. 12 is a flow diagram illustrating an exemplary process that dynamically determines the byte size of a transaction for transmitting a parcel portion.

FIG. 12 illustrates an exemplary process by which the sending system 14 or receiving system 18 dynamically determines the byte size of a transaction. Initially, the sending system 14 uses (step 200) a predetermined size for a transaction. In one embodiment, the predetermined size corresponds to the maximum size limit typically imposed by proxy servers on the network 30, which is 4 Mbytes. The larger the parcel portion, the better the delivery performance. The sending system 14 transmits (step 204) the transaction with the predetermined size; the proxy server 130 intercepts the transaction. If the size of the transaction exceeds the size limit allowed by the proxy server 130, then the proxy server 130 blocks further transmission of the transaction and reports (step 208) an error.

Upon receiving the error message, the sending system 14 reduces (step 216) the size of the transaction. In one embodiment, the transaction size reduces by half (e.g., 4 Mbytes portion becomes 2 Mbytes portion). Other criteria for reducing the transaction size can be used. The sending system 14 attempts to transmit (step 204) the transaction having the new, smaller size. If again the sending system 14 receives (step 208) an error message, the transaction is reduced (step 216) in size again. The process of transmitting and reducing continues until the sending system 14 no longer receives an error message from the proxy server 130 because of the size of the transmitted transaction.

The server system 14 subsequently transmits (step 212) the remaining parcel portions of the parcel 58 using the current parcel portion size that successfully passed through the proxy server 130. In another embodiment, the sending system 14 further optimizes the parcel portion size by attempting to transmit a parcel portion with a larger size than the current size, but with a smaller size than the parcel portion that last failed to pass through the firewall 130.

The receiving system 18 performs this process in a similar manner when requesting the parcel from the server system 26. Initially, the receiving system 18 uses (step 200) a predetermined size for a transaction. The receiving system 18 requests (step 204) the transaction with the predetermined size; the proxy server 132 intercepts the transaction. If the size of the transaction exceeds the size limit allowed by the proxy server 132, then the proxy server 132 prevents the receiving system 18 from receiving the transaction and an error results (step 208).

Upon detecting the error, the receiving system 18 reduces (step 216) the size of the transaction and attempts to request (step 204) the transaction having the reduced size. If again the receiving system 18 detects (step 208) an error, the transaction is reduced (step 216) in size again. The process of transmitting and reducing continues until the receiving system 18 no longer encounters an error because of the size of the transmitted transaction. The receiving system 18 subsequently requests (step 212) the remaining parcel portions of the parcel using the current transaction size that successfully passed through the proxy server 132.

In addition to dynamically determining the size of transmitted parcel portions, the sending system 14 can also dynamically determine the format of information encapsulated within the header of the meta-protocol. For example, the inclusion of information following the required information within the header of the HTTP protocol can have a variety of formats. In addition to information The end of the header is delineated by subsequent carriage return and line feed. Some proxy servers impose restrictions on this format. For example, one proxy server can restrict the number of bytes of information within a particular line within the HTTP header.

Figure 13:
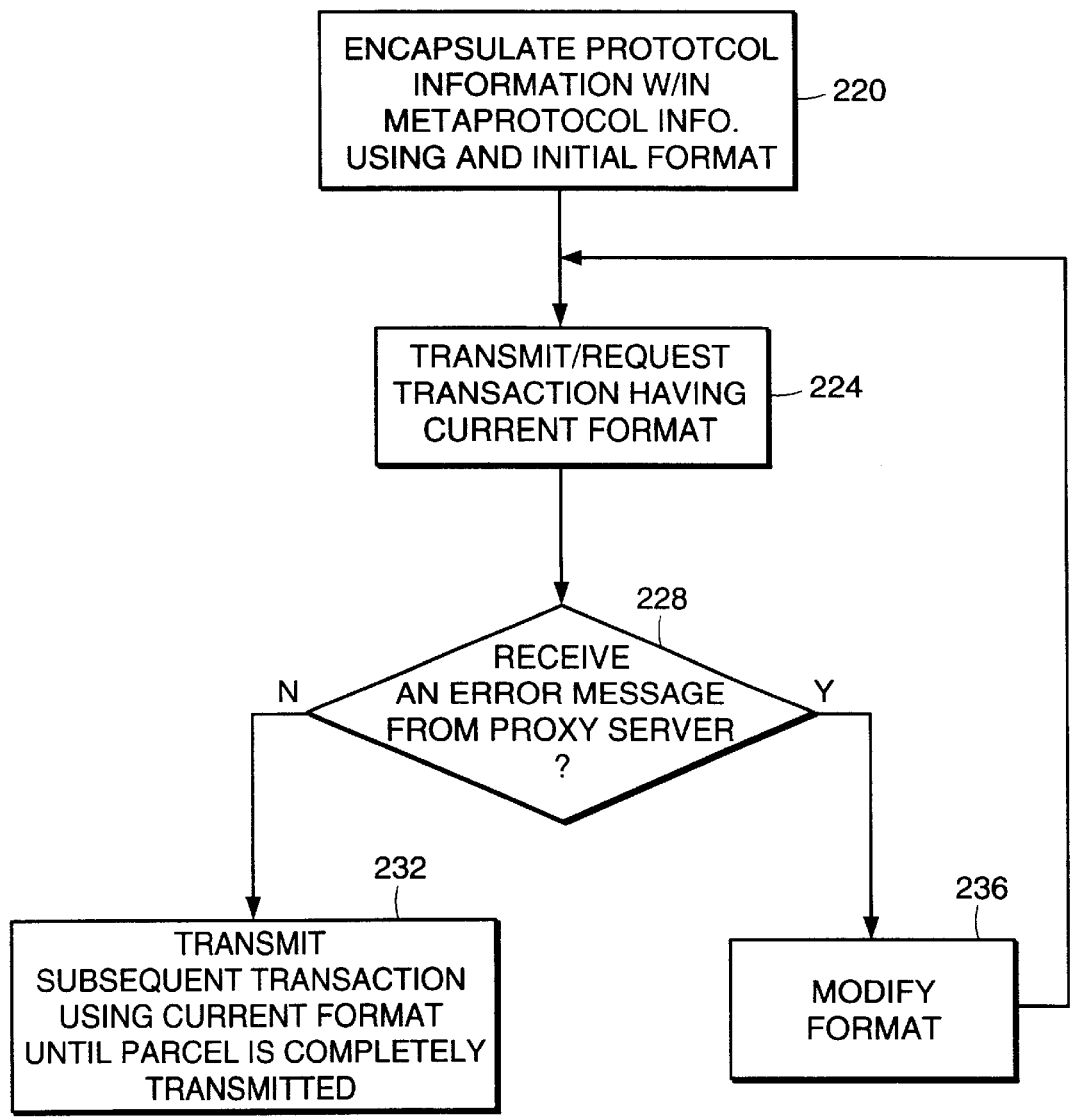
FIG. 13 is a flow diagram illustrating an exemplary process by which a system transmitting the parcel dynamically determines the format of information encapsulated within the meta-protocol transaction.

FIG. 13 illustrates an exemplary process by which the sending system 14 or receiving system 18 dynamically determines the format of the delivery service protocol information encapsulated within the meta-protocol information. Initially, the sending system 14 encapsulates delivery service protocol information (step 220) using a predetermined format. For example, the predetermined format for encapsulating 1 K bytes of protocol data can be four header lines with each header line having 256 bytes.

The sending system 14 transmits (step 224) the transaction with the initial format, and the proxy server 130 intercepts the transaction. If the proxy server 130 objects to the current format, the proxy server 130 blocks further transmission of the transaction and reports (step 228) an error to the sending system 14. Upon receiving the error message, the sending system 14 alters the format (step 236). In one embodiment, the sending system 14 reduces the number of bytes per header line by half (e.g., 256 bytes per line become 128 bytes per line) and doubles the number of header lines. Again, the sending system 14 can use other criteria for reducing the number of bytes per line within the header. The sending system 14 then attempts to transmit (step 224) the transaction with the new format.

Typically, reducing the number of bytes per header line to 128 bytes enables the transaction to pass through the firewall. If the sending system 14 again receives (step 228) an error message, the format is altered again (step 236). Transmitting (step 224) the transaction and altering (step 236) the format continues until the sending system 14 no longer receives an error message from the proxy server 130 because of the format of the transmitted transaction.

The server system 14 subsequently transmits (step 232) the remaining parcel portions of the parcel using the current format that successfully passed through the proxy server 130. In another embodiment, the sending system 14 optimizes the format by attempting to transmit a parcel portion with a format having more bytes per header line than the current format, but with fewer bytes per line than format of the transaction that last failed to pass through the proxy server 130.

The receiving system 18 performs the process described in FIG. 13 in a similar manner when requesting the parcel from the server system 26. The receiving system 18 encapsulates delivery service protocol information (step 220) using a predetermined initial format as described above. The receiving system 18 transmits (step 224) the transaction with the initial format, and the proxy server 132 intercepts the transaction. If the proxy server 132 objects to the current format, the proxy server 130 blocks further transmission of the transaction and reports (step 228) an error to the receiving system 18. Upon receiving the error message, the receiving system 18 alters the format (step 236). The receiving system 18 then attempts to transmit (step 224) the transaction with the new format.

If the receiving system 18 again receives (step 228) an error message, the format is altered again (step 236). Transmitting (step 224) the transaction and altering (step 236) the format continues until the receiving system 18 no longer receives an error message from the proxy server 132 because of the format of the transmitted transaction. The receiving system 18 subsequently transmits (step 232) the remaining parcel portions of the parcel using the current format that successfully passed through the proxy server 132.

Figure 14:
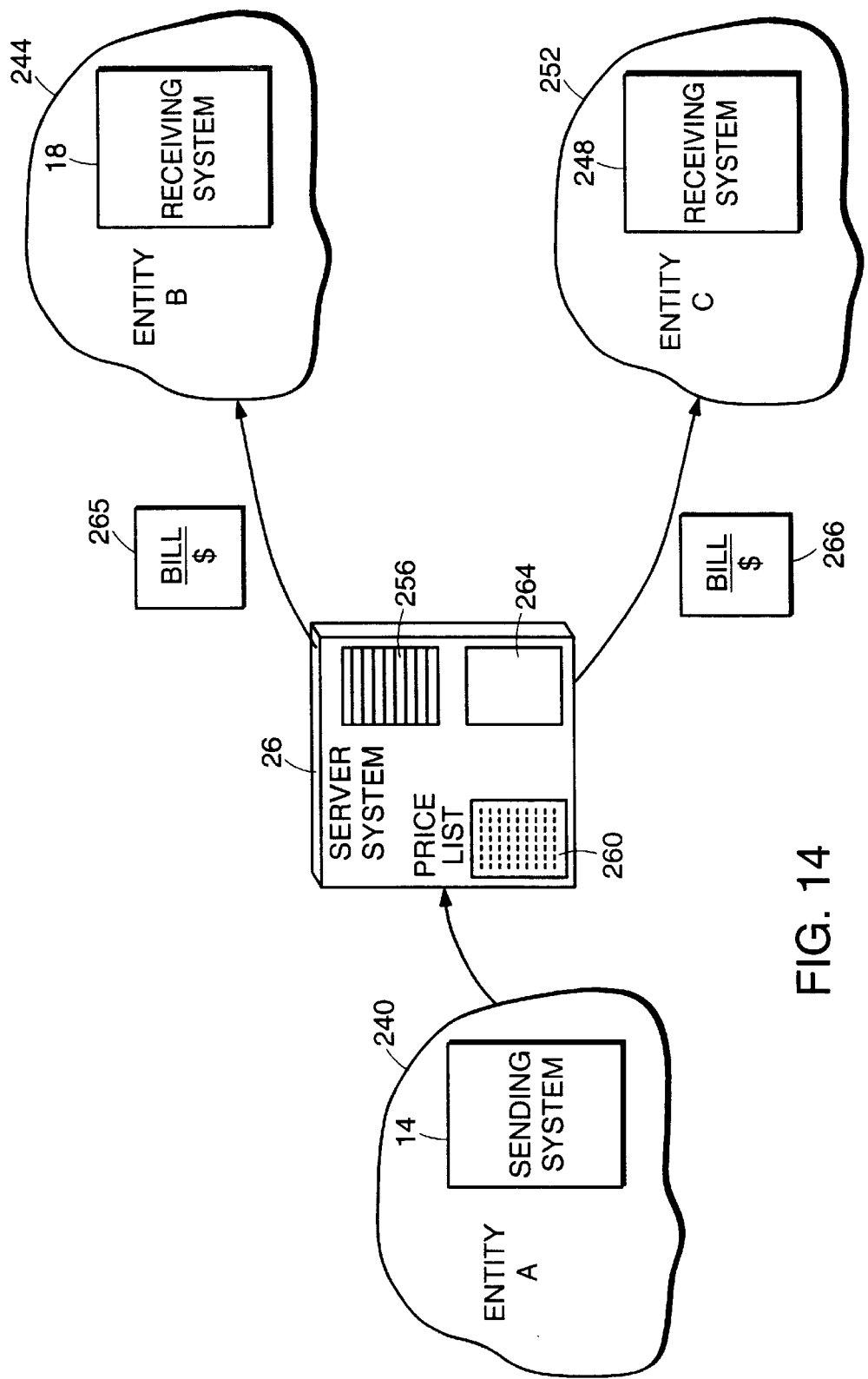
FIG. 14 is a diagram of an embodiment of the electronic parcel delivery system used for conducting electronic commerce.

The electronic parcel delivery system 10 can be integrated into various business operations. FIG. 14 illustrates an exemplary implementation in which the electronic delivery system 10 facilitates the conducting of electronic commerce. As shown, entity A 240 operates the sending system 14, entity B 244 operates the receiving system 18, and entity C 252 operates a second receiving system 248. In this embodiment, the server system 26 includes software 256, e.g., APIs (Application Program Interfaces), for defining the transactions that can be performed by sending and receiving systems 14, 18. For example, if the entity A 240 is in the business of delivering electronic newspapers, then defined transactions can include delivering a newspaper, subscribing to the newspaper, opening a electronic newspaper by a receiving system, canceling a subscription, etc.

The server system 26 also stores a software data structure 260 (e.g., a table) that associates a fee with each defined transaction. The data structure 260 operates as a price list. The software 256 includes a software module that maintains a record 264 of those transactions performed by the sending system 14 and each receiving system 18, 248. Another software module calculates an amount owed by each sending and receiving system by referencing the record 264 of performed transactions and the pricing list 260. The server system 26 can then generate invoices 265, 266 specifying the amount owed by each system. The server system 26 can deliver such invoices 265, 266 for payment to each receiving system 18, 248, or charge the respective credit card accounts.

Figure 15A:
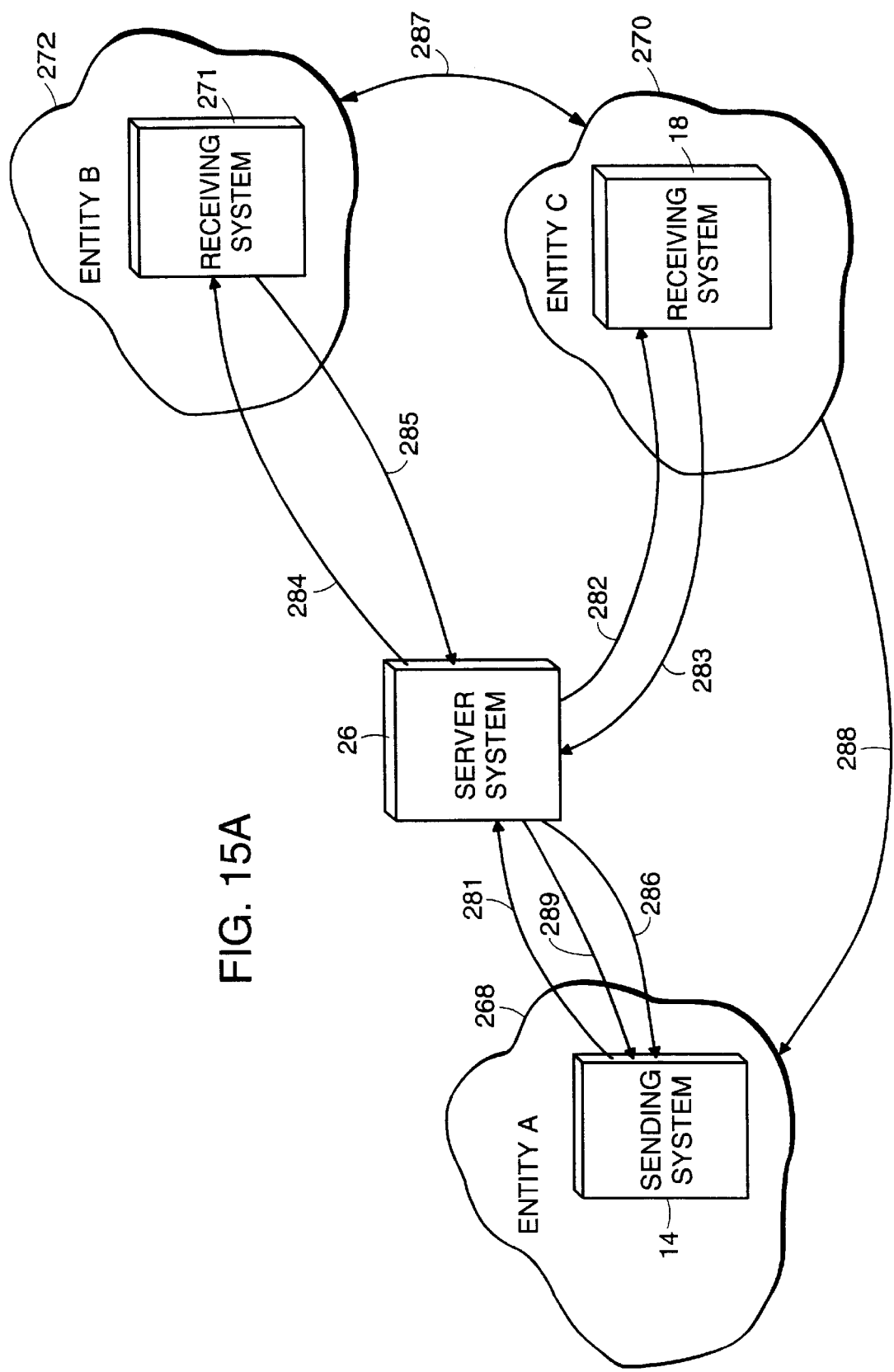
FIGS. 15A–15B are diagrams illustrating an embodiment of the electronic parcel delivery system used for coordinating order and receipt of goods among various entities.
Figure 15B:
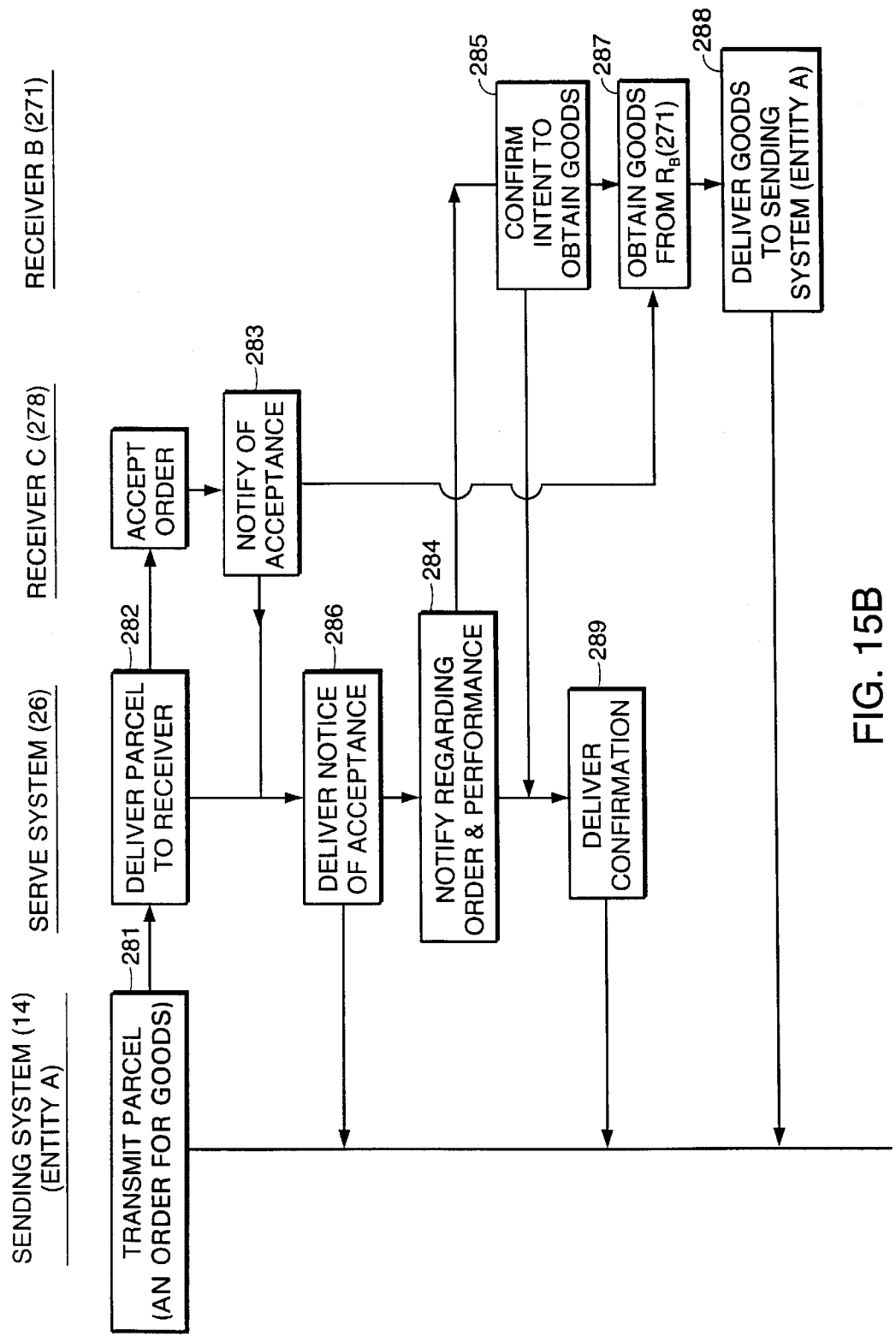

FIGS. 15A–15B illustrate an exemplary implementation of the electronic delivery system 10 in which the delivery service, operating on the server system 26, coordinates the purchase and delivery of a product among a purchaser entity A 268, and seller entity B 272, and a delivery entity C 270. The sending system 14 of the purchaser entity A 268 transmits 281 a parcel to the server system 26 for subsequent delivery to the receiving system 271 of the seller entity B 272. For example, such parcel can be an order for 100 automobile parts. In conjunction with sending the parcel to the server system 26, the sending system 14 notifies the receiving system 271 that the order is available at the server system 26. The receiving system 271 obtains 284 the order, as described above, and issues a confirmation 285 that the order will be filled.

In response to the confirmation 285, the server system 26 notifies 282 the receiving system 18 of the delivery entity C 270 requesting delivery for the placed order 284. Presumably, an agreement exists between the entity A 268 and entity C 270 whereby the entity C 270 will obtain and deliver upon such orders. The details of delivery, e.g., when and where the auto parts can be obtained, can be included in the notice 282. The receiving system 18 of the delivery entity C 270 can return a confirmation 283 to the server system 26. The sending system 14 can request the confirmations from the server system 26 or the server system 26 can automatically return the confirmations to the sending system 14. Accordingly, at the appointed time specified by the notice 282, the entity C can acquire the ordered goods, e.g., the 100 automobile parts, from seller entity B 272 and deliver such goods to entity A 268.

Figure 16A:
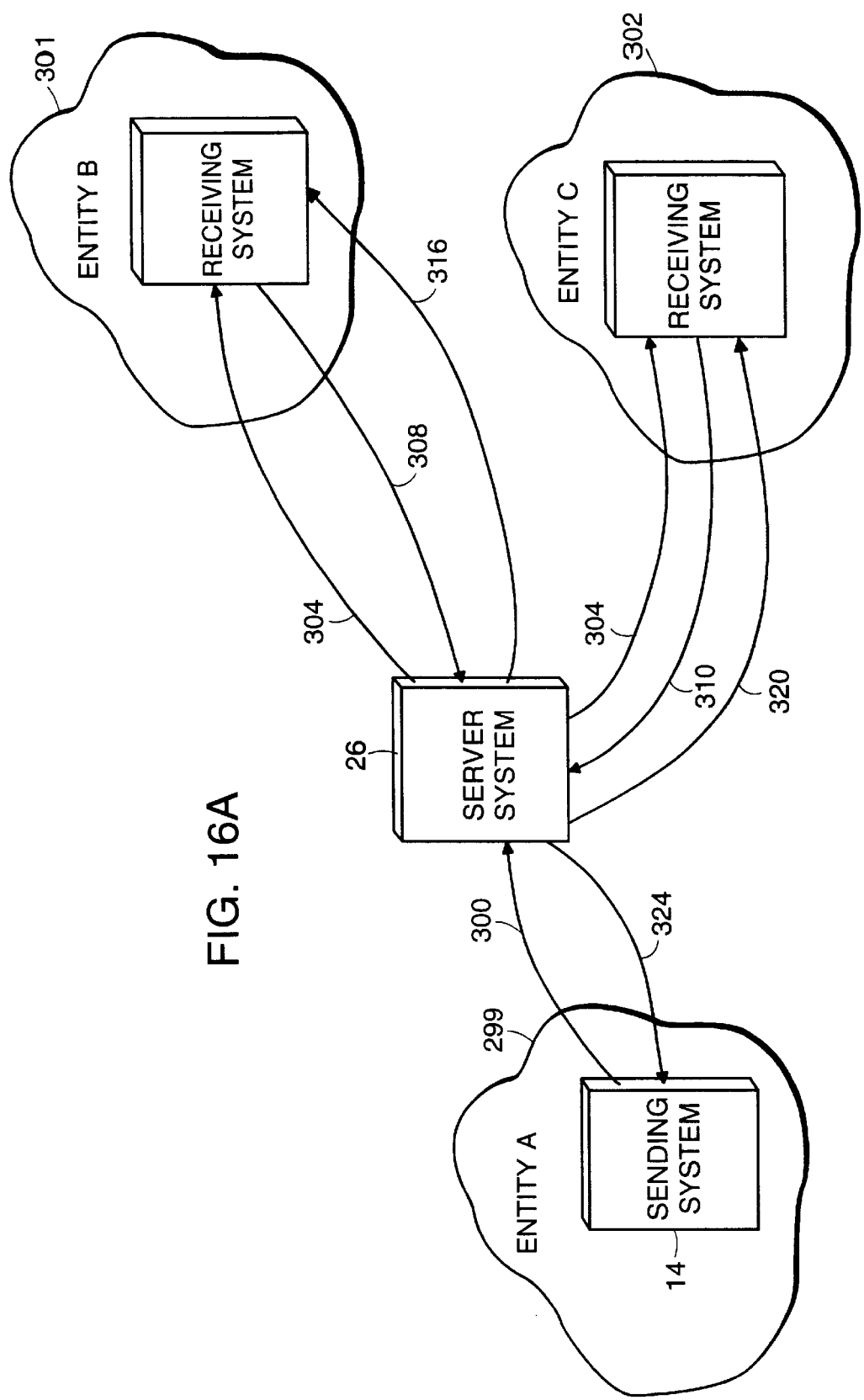
FIGS. 16A–16B is a flow diagram illustrating an exemplary process by which the electronic parcel delivery system coordinates work flow activities among various entities.
Figure 16B:
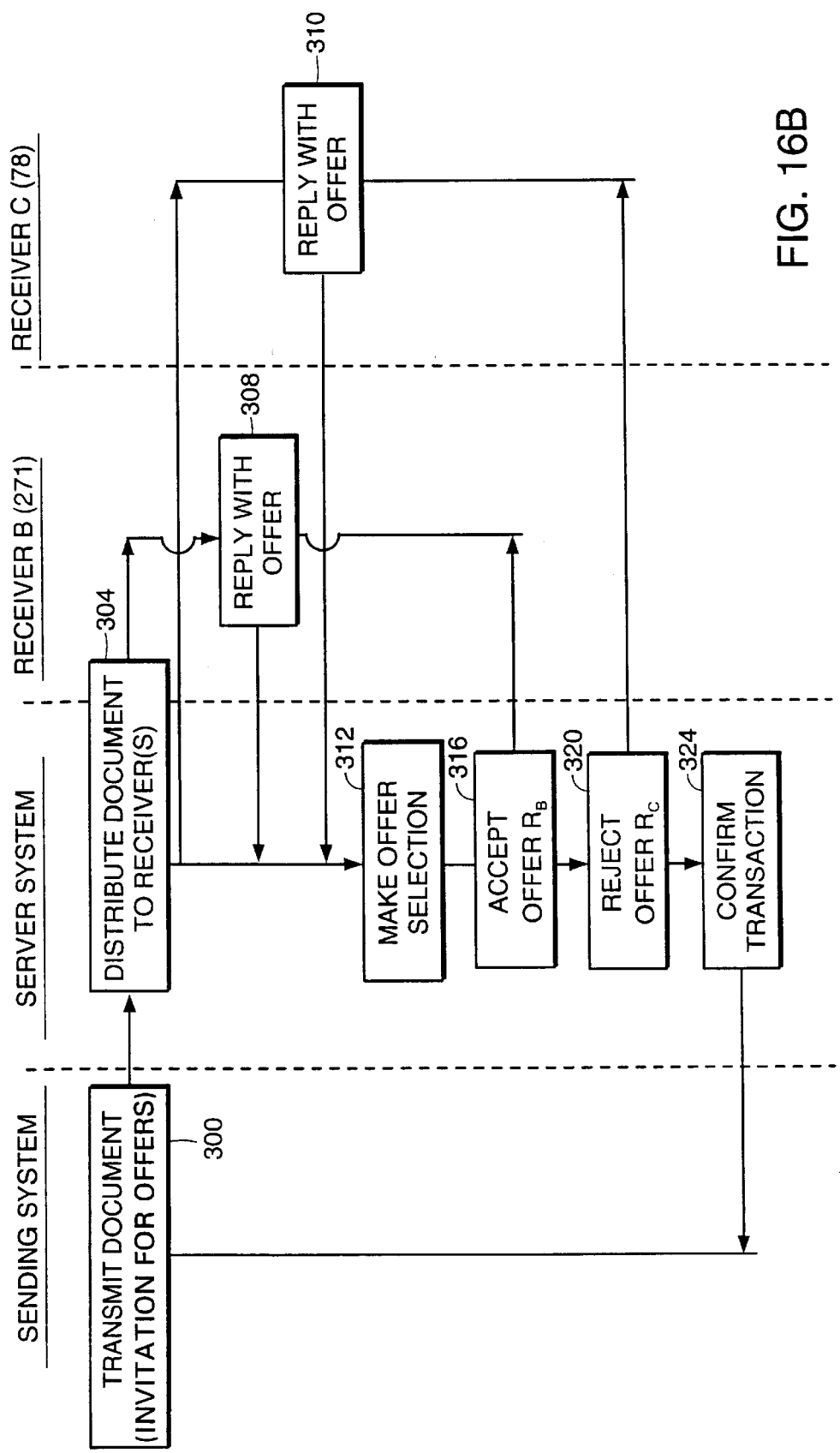

FIGS. 16A–16B illustrate an exemplary implementation of the electronic delivery system 10 in which the delivery service, operating on the server system 26, controls work flow in a operation involving a purchaser entity A 299 and two seller entities B and C 301, 302 respectively. The sending system 14 of the purchaser entity A 299 transmits 300 a parcel to the server system 26 for subsequent delivery to receiving systems 18 and 303. In one embodiment, the parcel is an invitation for offers regarding the price of particular goods (e.g., 100 automobile parts). In conjunction with sending the parcel to the server system 26, the sending system 14 notifies each receiving system 18, 303 of that the invitation is available at the server system 26. Each receiving system 18, 303 obtains 304 the parcel and replies with an offer 308, 310, respectively.

In response to the offers 308, the server system 26 executes software, e.g., customized APIs, that determines which offer to select. For illustration purposes only, the server system 26 accepts 316 the offer from entity B 301 and rejects 320 the offer from entity C 302. The server system 26 confirms the transaction with the sending system 14. Note that in another embodiment the sending system 14, rather than the server system 26, can perform the offer selection and issue the notices of acceptance and rejection.

Other embodiments of the electronic parcel delivery system 10 can combine the various implementations shown in FIGS. 14, 15A, 15B, 16A, and 16B.

Integration with Other Delivery Mechanisms

The electronic parcel delivery system 10 can cooperate with other parcel delivery mechanisms. For example, the server system 26 can print out a copy of the parcel received from the sending system 14. Rather than transmit the parcel to the receiving system 18 over the network 30, the server system 26 can fax the parcel to the receiving system 18. In another embodiment, the server system 26 prints a copy of the parcel on a printer and sends the printed copy through a carrier service.

The present invention may be implemented as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPOM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, LISP, PERL, and PROLOG. The software programs may be stored on or in one or more articles of manufacture as source code, object code, interpretive code, or executable code.

While the invention has been shown and described with reference to specific preferred embodiments, it should be understood by those skilled in the art that various changes in form and detail may be made therein without departing from the spirit and scope of the invention as defined by the following claims.

What is claimed is:

1. An apparatus for electronically delivering an electronic document to a receiving system over a network, comprising:
a sending system connected to the network and comprising digital information representing an electronic document designated for delivery to the receiving system and a processor executing encryption software to encode the document before transmitting the document on the network; and
a server system connected to the network to receive the encoded document, the server system comprising a processor executing decryption software to decode the document encoded by the sending system, executing encryption software to encode the decoded document, and delivering the document to the receiving system, wherein the processor begins delivery of the document to the receiving system only after receiving a request for the document from the receiving system.

2. The apparatus of claim 1 wherein the encryption software on the server system uses a different key for encoding the electronic document than the encryption software on the sending device.

3. The apparatus of claim 1 wherein the encryption software on the sending system is a first encryption software and the sending system further comprises a second encryption software for encoding the document using a key associated with the receiving system before encoding the electronic document with the first encryption software.

4. The apparatus of claim 1 wherein the server system is a certificate authority.

5. The apparatus of claim 1 wherein the server system further comprises:
a first software module maintaining a record of transactions performed by the receiving system;
a data structure stored in memory associating a fee with each performed transaction; and a second software module calculating an amount owed in response to the record of performed transactions and the data structure.

6. The apparatus of claim 5 wherein the server system further comprises a third software module generating an invoice including the amount owed.

7. The apparatus of claim 5 wherein the server system further comprises a third software module defining each transaction that can be performed by the receiving system.

8. The apparatus of claim 1 further comprising a plurality of receiving systems, each receiving sytem and wherein the document is a request for offers.

9. A method for delivering goods to a sending system, comprising the steps of:
transmitting over the network a document to a server system designated for subsequent delivery to a first receiving system operated by a first entity, the document specifying a request to acquire goods from the first entity;
transmitting a notice to the first receiving system signifying that the document can be accessed at the server system;
transmitting the document to the first receiving system;
receiving in response to the document a confirmation at the server system from the first receiving system indicating acceptance of the request for acquisition of the goods; and
transmitting in response to the confirmation a notice to a second receiving system operated by a second entity requesting that the second entity obtain the goods from the first entity.

10. The method of claim 9 further comprising the steps of:
maintaining a record of transactions performed by the receiving system;
associating a fee with each performed transaction; and
calculating an amount owed in response to the record of performed transactions and the data structure.

11. A method of claim 9 further comprising the steps of:
transmitting over the network a document to a server system designated for subsequent delivery to a plurality of receiving systems each operated by an entity, the document soliciting a response from each entity operating a receiving system, the response from each entity offering particular goods for a price;

selecting one of the responses according to a predetermined criteria;

transmitting a notice indicating acceptance of the offer of selected response transmitting a notice to the each receiving system signifying that the document can be accessed at the server system;

transmitting the document to each receiving system requesting the document;

maintaining a record of transactions performed by the receiving system;

associating a fee with each performed transaction; and calculating an amount owed in response to the record of performed transactions and the data structure.

12. A method for delivering an electronic parcel over a network, comprising the steps of:

obtaining approval to transmit digital information to a server sytem;

determining a portion size for transmitting the digital information;

determining a format for a transaction;

generating the transaction having an amount of digital information approximately equal to the portion size; and transmitting the transaction over the network to the server system.

* * * * *